(12) United States Patent
Venugopal et al.

(10) Patent No.: US 11,324,028 B2
(45) Date of Patent: May 3, 2022

(54) TRANSMISSION CONFIGURATION INDICATOR PATTERN LIST FOR SHARED CHANNEL TRANSMISSION

(71) Applicant: QUALCOMM Incorporated, San Diego, CA (US)

(72) Inventors: Kiran Venugopal, Raritan, NJ (US); Makesh Pravin John Wilson, San Diego, CA (US); Tianyang Bai, Bridgewater, NJ (US); Juan Montojo, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 16/443,177

(22) Filed: Jun. 17, 2019

(65) Prior Publication Data
US 2019/0394793 A1 Dec. 26, 2019

Related U.S. Application Data

(60) Provisional application No. 62/689,023, filed on Jun. 22, 2018.

(51) Int. Cl.
*H04W 72/12* (2009.01)
*H04W 48/12* (2009.01)
(Continued)

(52) U.S. Cl.
CPC ....... *H04W 72/1289* (2013.01); *H04L 5/0005* (2013.01); *H04L 27/2646* (2013.01); *H04W 48/12* (2013.01); *H04W 76/27* (2018.02)

(58) Field of Classification Search
CPC ......... H04W 72/0446; H04W 72/1263; H04W 72/1289; H04W 48/12; H04W 76/27;
(Continued)

(56) References Cited

U.S. PATENT DOCUMENTS 10,554,262 B2 * 2/2020 John Wilson ........ H04B 7/0413
10,701,696 B2 * 6/2020 Shi .......................... H04L 5/001
(Continued)

OTHER PUBLICATIONS

Retransmission scheme for 5G radio Interface, IEEE Globecom workshops, pp. 1-6; Author: Cong Shi; (Year: 2016).*
(Continued)

*Primary Examiner* — Hanh N Nguyen
(74) *Attorney, Agent, or Firm* — Danai Nelisile Mhembere; Holland & Hart LLP

(57) ABSTRACT

Methods, systems, and devices for wireless communications are described. A base station may configure a user equipment (UE) with a list of transmission configuration indicator (TCI) state patterns where each entry in the list may correspond to a different TCI state pattern. The base station may transmit an indication of a selected entry from the TCI state pattern list and transmit a grant to the UE indicating that resources have been allocated in for transmitting a transport block (TB). The UE may receive the grant and attempt to receive the TB in accordance with the indicated TCI state pattern. The UE may generate multi-bit feedback to indicate whether the UE was able to successfully decode the TB and transmit the feedback to the base station. The base station may use the multi-bit feedback for determining whether to select a different TCI state pattern.

30 Claims, 16 Drawing Sheets

(51) Int. Cl.
*H04W 76/27* (2018.01)
*H04L 27/26* (2006.01)
*H04L 5/00* (2006.01)

(58) Field of Classification Search
CPC .......... H04W 72/0413; H04W 72/042; H04W 72/0493; H04L 5/0005; H04L 27/2647; H04L 5/0048; H04L 1/00; H04L 1/1812; H04L 27/2646; H04L 1/1825; H04L 27/2602; H04L 5/001; H04L 5/0055; H04L 5/0094; H04L 1/1614; H04L 1/1671; H04L 1/1893
See application file for complete search history.

(56) References Cited

U.S. PATENT DOCUMENTS

| | | | |
|---|---|---|---|
| 10,849,152 B2* | 11/2020 | Davydov | H04B 7/0626 |
| 2017/0064726 A1 | 3/2017 | Chen et al. | |
| 2017/0310426 A1 | 10/2017 | Fan et al. | |
| 2018/0014298 A1 | 1/2018 | Sun et al. | |
| 2019/0297603 A1* | 9/2019 | Guo | H04B 7/0695 |
| 2020/0099474 A1* | 3/2020 | Wikstrom | H04L 1/0075 |
| 2020/0112974 A1* | 4/2020 | Sun | H04W 72/10 |
| 2020/0221487 A1* | 7/2020 | Lee | H04B 7/00 |
| 2020/0314881 A1* | 10/2020 | Bagheri | H04W 72/1273 |
| 2021/0185709 A1* | 6/2021 | Takeda | H04L 1/0612 |

OTHER PUBLICATIONS

International Search Report and Written Opinion—PCT/US2019/037670—ISA/EPO—dated Oct. 8, 2019.

* cited by examiner

TRANSMISSION CONFIGURATION INDICATOR PATTERN LIST FOR SHARED CHANNEL TRANSMISSION

CROSS REFERENCE

The present Application for Patent claims the benefit of U.S. Provisional Patent Application No. 62/689,023 by VENUGOPAL, et al., entitled "TRANSMISSION CONFIGURATION INDICATOR PATTERN LIST FOR SHARED CHANNEL TRANSMISSION," filed Jun. 22, 2018, assigned to the assignee hereof, and expressly incorporated herein.

BACKGROUND

The following relates generally to wireless communications, and more specifically to transmission configuration indicator (TCI) pattern lists.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Various communication systems may use different frequency bands depending on the particular needs of the system. For example, a millimeter wave frequency band (which may be between 20 and 300 GHz) may be used where a large concentration of UEs are relatively close to one another and/or where a relatively large amount of data is to be transferred from a base station to one or more UEs, or vice versa. Some types of signals, including millimeter wavelength signals, may frequently experience high path loss, and as a result, directional beamforming techniques may be used for uplink (UL) and/or downlink (DL) transmissions between a base station and a UE. In some cases, the base station may transmit configuration information to a UE for coordinating use of transmit and receive beams, and uplink and downlink transmissions between the base station and the UE may be in accordance with the configuration information. Conventional configuration techniques are deficient.

SUMMARY

The described techniques relate to improved methods, systems, devices, and apparatuses that support transmission configuration indicator (TCI) pattern lists (e.g., a TCI pattern list for shared channel transmission). Generally, the described techniques provide for a user equipment (UE) transmitting multi-bit feedback that provides transmission time interval (TTI) by TTI feedback to allow a base station to select a TCI state pattern to enhance wireless communications with the UE. In some examples, a base station may select between different TCI state patterns and transmit the same transport block (TB) in each TTI of multiple TTIs to the UE in accordance with the selected TCI state pattern. The TCI state pattern may indicate one or more TCI states, and to which of the multiple TTIs a particular TCI state applies. A TCI state may, for example, correspond to which transmit beam of a set of beams will be used by the base station for transmitting a TB in a particular TTI.

In an example, a base station may configure the UE with a list of TCI state patterns, and each entry in the list may correspond to a different TCI state pattern. A base station may select an entry from the TCI state pattern list and indicate the selected TCI state pattern to the UE. For example, the selected TCI state pattern may indicate to apply a same TCI state when transmitting the TB in each of the multiple TTIs. In another example, the selected TCI state pattern may indicate that a first TCI state is being applied for transmitting the TB in a first subset of the TTIs, and that a second TCI state is being applied for transmitting the TB in a second subset of the TTIs. The base station may transmit a grant to the UE indicating that resources have been allocated in the multiple TTIs for transmitting the TB.

The UE may receive the grant and attempt to receive the TB in the multiple TTIs in accordance with the TCI state pattern indicated by the base station. The UE may determine which TCI state to apply, and corresponding receive beam to use for receiving a transmission, during each of the TTIs in accordance with the indicated TCI state pattern. The UE may attempt to decode the TB in each TTI of the multiple TTIs and may generate feedback to indicate whether the UE was able to successfully decode the TB in at least one TTI. In an example, the feedback may be a bit sequence such that each bit of the multi-bit feedback indicates whether the UE was able to successfully decode the TB in a corresponding TTI, and the UE may transmit the multi-bit feedback to the base station. In some examples, the multi-bit feedback may indicate a TTI that corresponds with the first successfully-decoded TB or which TTI corresponds to a preferred TCI state (e.g., associated with a transmission received in a TTI having a highest or best channel metric). The base station may use the multi-bit feedback for determining whether to select a different TCI state pattern, and thus the base station may determine whether to change a TCI state and/or an order of TCI states used for communicating a TB.

A method of wireless communication at a UE is described. The method may include receiving a configuration message indicating a list that includes a set of TCI state patterns, receiving control signaling indicating a first TCI state pattern of the set of TCI state patterns, receiving, via a shared data channel, a TB in each TTI of a set of TTIs in accordance with the first TCI state pattern, and transmitting multiple bit feedback indicating at least one TTI of the set of TTIs for which decoding of the TB was successful.

An apparatus for wireless communication at a UE is described. The apparatus may include a processor, memory in electronic communication with the processor, and instructions stored in the memory. The instructions may be executable by the processor to cause the apparatus to receive a configuration message indicating a list that includes a set of TCI state patterns, receive control signaling indicating a first TCI state pattern of the set of TCI state patterns, receive, via a shared data channel, a TB in each TTI of a set of TTIs in accordance with the first TCI state pattern, and transmit multiple bit feedback indicating at least one TTI of the set of TTIs for which decoding of the TB was successful.

Another apparatus for wireless communication at a UE is described. The apparatus may include means for receiving a configuration message indicating a list that includes a set of TCI state patterns, receiving control signaling indicating a first TCI state pattern of the set of TCI state patterns, receiving, via a shared data channel, a TB in each TTI of a set of TTIs in accordance with the first TCI state pattern, and transmitting multiple bit feedback indicating at least one TTI of the set of TTIs for which decoding of the TB was successful.

A non-transitory computer-readable medium storing code for wireless communication at a UE is described. The code may include instructions executable by a processor to receive a configuration message indicating a list that includes a set of TCI state patterns, receive control signaling indicating a first TCI state pattern of the set of TCI state patterns, receive, via a shared data channel, a TB in each TTI of a set of TTIs in accordance with the first TCI state pattern, and transmit multiple bit feedback indicating at least one TTI of the set of TTIs for which decoding of the TB was successful.

In some examples of the method, apparatuses, and non-transitory computer-readable medium described herein, each TCI state pattern of the set of TCI state patterns indicates one or more TCI states and a number of TTIs to which each of the one or more TCI states applies.

In some examples of the method, apparatuses, and non-transitory computer-readable medium described herein, receiving the TB further may include operations, features, means, or instructions for identifying a first TCI state for a first TTI of the set of TTIs and a second TCI state for a second TTI of the set of TTIs based on the first TCI state pattern, identifying a first receive beam based on the first TCI state and a second receive beam based on the second TCI state and receiving the TB during the first TTI using the first receive beam and the TB during the second TTI using the second receive beam.

Some examples of the method, apparatuses, and non-transitory computer-readable medium described herein may further include operations, features, means, or instructions for receiving second control signaling indicating a second TCI state pattern of the set of TCI state patterns, where the second TCI state pattern indicates a TCI state or an order for a set of TCI states that differs from a TCI state or an order for the set of TCI states indicated in the first TCI state pattern, receiving a retransmission of the TB in each TTI of a second set of TTIs in accordance with the second TCI state pattern and transmitting second multiple bit feedback indicating whether decoding of the retransmission of the TB in at least one TTI of the set of TTIs was successful.

In some examples of the method, apparatuses, and non-transitory computer-readable medium described herein, the second control signaling may be received in response to the multiple bit feedback.

Some examples of the method, apparatuses, and non-transitory computer-readable medium described herein may further include operations, features, means, or instructions for receiving second control signaling indicating a second TCI state pattern of the set of TCI state patterns, where the second TCI state pattern indicates a TCI state or an order for a set of TCI states that differs from a TCI state or an order for the set of TCI states indicated in the first TCI state pattern, receiving a second TB in each TTI of a second set of TTIs in accordance with the second TCI state pattern and transmitting second multiple bit feedback indicating whether decoding of the retransmission of the TB in at least one TTI of the set of TTIs was successful.

In some examples of the method, apparatuses, and non-transitory computer-readable medium described herein, the second control signaling may be received in response to the multiple bit feedback.

In some examples of the method, apparatuses, and non-transitory computer-readable medium described herein, receiving the configuration message indicating the list further may include operations, features, means, or instructions for receiving a RRC message indicating the list.

In some examples of the method, apparatuses, and non-transitory computer-readable medium described herein, the control signaling may be DCI or a medium access control (MAC) control element (CE).

Some examples of the method, apparatuses, and non-transitory computer-readable medium described herein may further include operations, features, means, or instructions for receiving a grant scheduling transmission of the TB during each TTI of the set of TTIs.

In some examples of the method, apparatuses, and non-transitory computer-readable medium described herein, the first TCI state pattern indicates a same TCI state for each TTI of the set of TTIs.

In some examples of the method, apparatuses, and non-transitory computer-readable medium described herein, the first TCI state pattern indicates a first TCI state for a first TTI subset of the set of TTIs and a second TCI state for a second TTI subset of the set of TTIs.

In some examples of the method, apparatuses, and non-transitory computer-readable medium described herein, each bit of the multiple bit feedback corresponds to a respective TTI of the set of TTIs.

In some examples of the method, apparatuses, and non-transitory computer-readable medium described herein, the multiple bit feedback indicates a particular TCI state of a set of TCI states.

In some examples of the method, apparatuses, and non-transitory computer-readable medium described herein, the multiple bit feedback includes a TTI number of the at least one TTI.

In some examples of the method, apparatuses, and non-transitory computer-readable medium described herein, the multiple bit feedback indicates an earliest TTI of the set of TTIs for which decoding of the TB was successful.

A method of wireless communication at a base station is described. The method may include transmitting a configuration message indicating a list that includes a set of TCI state patterns, transmitting control signaling indicating a first TCI state pattern of the set of TCI state patterns, transmitting, via a shared data channel, a TB in each TTI of a set of TTIs in accordance with the first TCI state pattern, and receiving multiple bit feedback indicating at least one TTI of the set of TTIs for which decoding of the TB was successful.

An apparatus for wireless communication at a base station is described. The apparatus may include a processor, memory in electronic communication with the processor, and instructions stored in the memory. The instructions may be executable by the processor to cause the apparatus to transmit a configuration message indicating a list that includes a set of TCI state patterns, transmit control signaling indicating a first TCI state pattern of the set of TCI state patterns, transmit, via a shared data channel, a TB in each TTI of a set of TTIs in accordance with the first TCI state pattern, and receive multiple bit feedback indicating at least one TTI of the set of TTIs for which decoding of the TB was successful.

Another apparatus for wireless communication at a base station is described. The apparatus may include means for transmitting a configuration message indicating a list that includes a set of TCI state patterns, transmitting control signaling indicating a first TCI state pattern of the set of TCI state patterns, transmitting, via a shared data channel, a TB in each TTI of a set of TTIs in accordance with the first TCI state pattern, and receiving multiple bit feedback indicating at least one TTI of the set of TTIs for which decoding of the TB was successful.

A non-transitory computer-readable medium storing code for wireless communication at a base station is described. The code may include instructions executable by a processor to transmit a configuration message indicating a list that includes a set of TCI state patterns, transmit control signaling indicating a first TCI state pattern of the set of TCI state patterns, transmit, via a shared data channel, a TB in each TTI of a set of TTIs in accordance with the first TCI state pattern, and receive multiple bit feedback indicating at least one TTI of the set of TTIs for which decoding of the TB was successful.

In some examples of the method, apparatuses, and non-transitory computer-readable medium described herein, each TCI state pattern of the set of TCI state patterns indicates one or more TCI states and a number of TTIs to which each of the one or more TCI states applies.

Some examples of the method, apparatuses, and non-transitory computer-readable medium described herein may further include operations, features, means, or instructions for selecting a second TCI state pattern of the set of TCI state patterns based on the multiple bit feedback, where the second TCI state pattern indicates a TCI state or an order for a set of TCI states that differs from a TCI state or an order for the set of TCI states indicated in the first TCI state pattern, transmitting second control signaling indicating the second TCI state pattern, transmitting a retransmission of the TB in each TTI of a second set of TTIs in accordance with the second TCI state pattern and receiving second multiple bit feedback indicating whether decoding of the retransmission of the TB in at least one TTI of the set of TTIs was successful.

Some examples of the method, apparatuses, and non-transitory computer-readable medium described herein may further include operations, features, means, or instructions for selecting a second TCI state pattern of the set of TCI state patterns based on the multiple bit feedback, where the second TCI state pattern indicates a TCI state or an order for a set of TCI states that differs from a TCI state or an order for the set of TCI states indicated in the first TCI state pattern, transmitting second control signaling indicating the second TCI state pattern, transmitting a second TB in each TTI of a second set of TTIs in accordance with the second TCI state pattern and receiving second multiple bit feedback whether decoding of the second TB in at least one TTI of the set of TTIs was successful.

In some examples of the method, apparatuses, and non-transitory computer-readable medium described herein, receiving the TB further may include operations, features, means, or instructions for identifying a first TCI state for a first TTI of the set of TTIs and a second TCI state for a second TTI of the set of TTIs based on the first TCI state pattern, identifying a first transmit beam based on the first TCI state and a second transmit beam based on the second TCI state and transmitting the TB during the first TTI using the first transmit beam and the TB during the second TTI using the second transmit beam.

In some examples of the method, apparatuses, and non-transitory computer-readable medium described herein, transmitting the configuration message indicating the list further may include operations, features, means, or instructions for transmitting a RRC message indicating the list.

In some examples of the method, apparatuses, and non-transitory computer-readable medium described herein, the control signaling may be DCI or a MAC CE.

Some examples of the method, apparatuses, and non-transitory computer-readable medium described herein may further include operations, features, means, or instructions for transmitting a grant scheduling transmission of the TB during each TTI of the set of TTIs.

In some examples of the method, apparatuses, and non-transitory computer-readable medium described herein, the first TCI state pattern indicates a same TCI state for each TTI of the set of TTIs.

In some examples of the method, apparatuses, and non-transitory computer-readable medium described herein, the first TCI state pattern indicates a first TCI state for a first TTI subset of the set of TTIs and a second TCI state for a second TTI subset of the set of TTIs.

In some examples of the method, apparatuses, and non-transitory computer-readable medium described herein, each bit of the multiple bit feedback corresponds to a respective TTI of the set of TTIs.

In some examples of the method, apparatuses, and non-transitory computer-readable medium described herein, the multiple bit feedback indicates a particular TCI state of a set of TCI states.

In some examples of the method, apparatuses, and non-transitory computer-readable medium described herein, the multiple bit feedback includes a TTI number of the at least one TTI.

In some examples of the method, apparatuses, and non-transitory computer-readable medium described herein, the multiple bit feedback indicates an earliest TTI of the set of TTIs for which decoding of the TB was successful.

DETAILED DESCRIPTION

Figure 1:
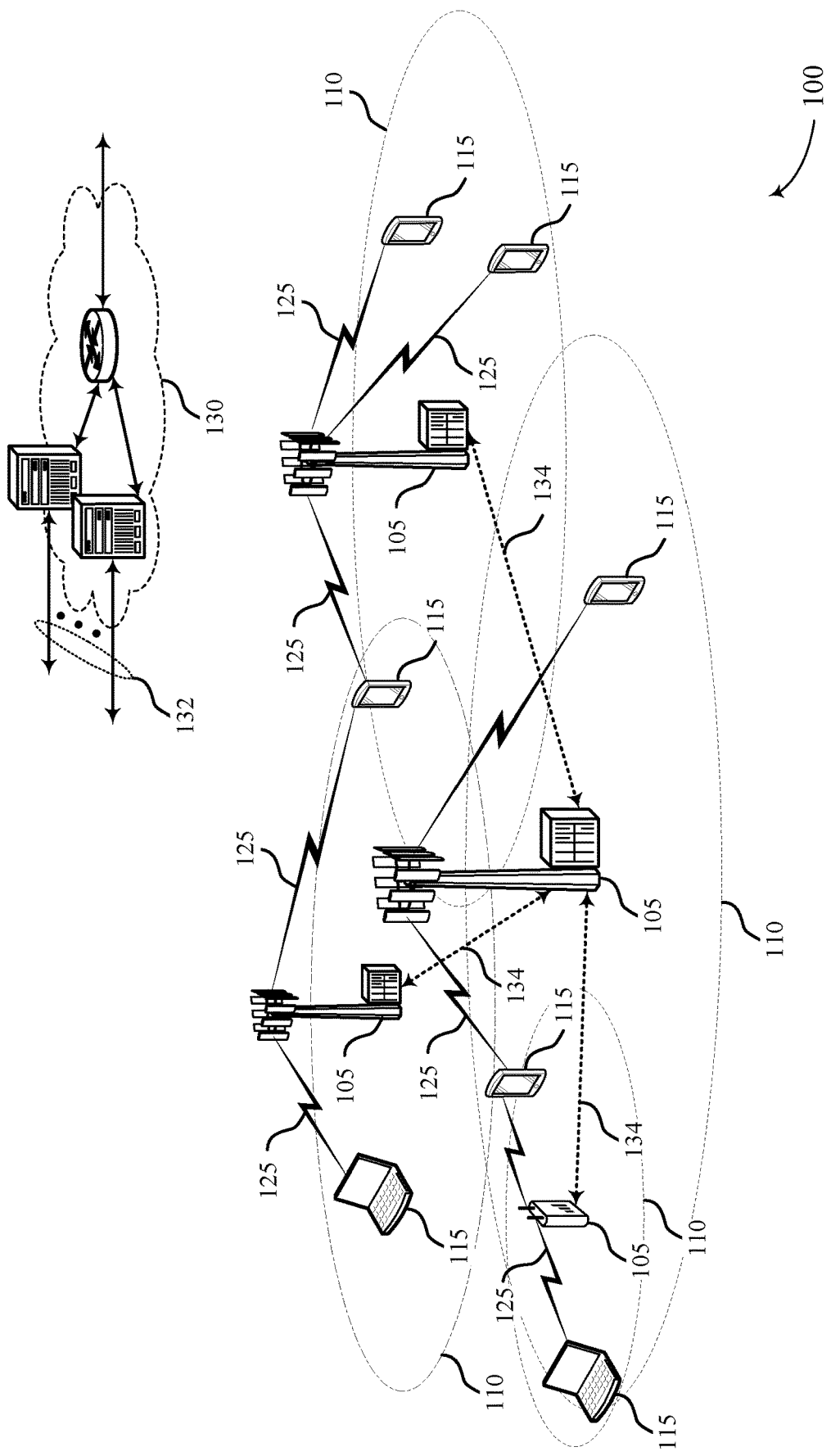
FIGS. 1 and 2 illustrate examples wireless communications systems that support transmission configuration indicator (TCI) pattern lists in accordance with aspects of the present disclosure.

The described techniques relate to improved methods, systems, devices, or apparatuses that support transmission configuration indicator (TCI) pattern lists (e.g., a TCI pattern list for shared channel transmission). Generally, the described techniques provide for generating and transmitting multi-bit feedback of downlink communications to allow a base station to manage TCI state patterns for wireless communications. Beneficially, the techniques described herein may improve or enhance the ability of a base station to manage which TCI state and/or an order of TCI states to use for communicating a transport block (TB) to a user equipment (UE).

In some wireless communications systems, a base station may utilize directional transmit beams to transmit wireless communications to a UE. The base station may indicate a TCI state to a UE, where the TCI state may correspond to a transmission configuration (e.g., a transmit beam) that is to be utilized by the base station to transmit control information and/or data to the UE. A UE in communication with the base station may configure its receiver based on an indicated TCI state (e.g., select a receive beam corresponding to the transmit beam). In some cases, a base station may transmit the same downlink information (e.g., TB) across multiple transmission time intervals (TTIs).

In conventional techniques, a UE may generate one-bit feedback based on decoding that combines information derived from transmissions that include a same TB received across the multiple TTIs. Because the UE is expecting the same TB in each of the TTIs, the UE may combine logarithm likelihood ratios (LLRs) generated for the TB from each TTI during decoding and perform a cyclic redundancy check (CRC) using the combined LLRs. If the CRC does not pass for a particular TTI, the UE may combine the accumulated LLRs with the LLRs determined for a next TTI and again perform the CRC. This process may repeat until all TTIs have been checked and CRC fails, or CRC passes. The UE may generate a one-bit feedback to indicate whether the UE was able to successfully decode the TB from the set of multiple TTIs in which the TB was transmitted. However, such one-bit feedback may not provide sufficient information to the base station in some transmission configuration schemes. For example, when the base station utilizes multiple TCI states to transmit the same TB in a respective TTI of the multiple TTIs, one-bit feedback cannot indicate which TTI, and corresponding TCI state, the UE was able to successfully decode.

In accordance with the techniques described herein, the UE may generate multi-bit feedback. In some examples, each bit of the multi-bit feedback corresponds to one of the TTIs across which the base station transmitted a TB. In some examples, the multi-bit feedback may indicate a first TTI in which the UE was able to successfully decode the TB. In some examples, the multi-bit feedback may indicate a preferred TCI state identified by the UE based on a transmission received in a TTI having a highest or best channel metric among the TTIs.

In an example, a base station may utilize one or more TCI states when communicating with a UE. A TCI state may specify a transmission configuration (e.g., a transmit beam) that may be utilized to transmit information (e.g., a TB) within a TTI. A base station may determine TCI state patterns that correspond to orders in which the base station may apply TCI states across multiple TTIs and may configure a UE with a list of TCI state patterns. Each entry in the list may correspond to a different TCI state pattern and indicate the number of TTIs to which the TCI state pattern may apply. A base station may select an entry from the TCI state pattern list and indicate the selected TCI state pattern to the UE. For example, the selected TCI state pattern may indicate to apply a same TCI state when transmitting the TB in each of the multiple TTIs. In another example, the selected TCI state pattern may indicate that a first TCI state is being applied for transmitting the TB in a first subset of the TTIs, and that a second TCI state is being applied for transmitting the TB in a second subset of the TTIs. The base station may transmit a grant to the UE indicating that resources have been allocated in the multiple TTIs for transmitting the TB.

The UE may receive the grant and attempt to receive the TB across the multiple TTIs in accordance with the TCI state pattern indicated by the base station. The UE may determine which TCI state to apply during each of the TTIs in accordance with the indicated TCI state pattern. For example, the UE may select which receive beam to use for each TTI of the multiple TTIs in accordance with the indicated TCI state pattern. The UE may attempt to decode the TB in each TTI of the multiple TTIs and may generate multi-bit feedback to indicate whether the UE was able to successfully decode the TB in at least one of the multiple TTIs.

In an example, the feedback may be a bit sequence such that each bit of the multi-bit feedback indicates whether the corresponding TTI includes a successfully decoded TB. In some examples, an order of bits in the bit sequence may correspond to an order of the TTIs. In some examples, the feedback may indicate the TTI that corresponds with the first successfully-decoded TB or which TTI corresponds to a preferred TCI state. The UE may transmit the multi-bit feedback to the base station. The base station may use the multi-bit feedback for determining whether to select a different TCI state pattern, and may use the multi-bit feedback for determining whether to change a TCI state and/or an order of TCI states used for communicating a TB to the UE.

Aspects of the disclosure are initially described in the context of wireless communications systems. Aspects of the disclosure are then described in the context of TTI configurations and a process flow. Aspects of the disclosure are further illustrated by and described with reference to apparatus diagrams, system diagrams, and flowcharts that relate to transmission configuration indicator pattern list for shared channel transmission.

FIG. 1 illustrates an example of a wireless communications system 100 that supports TCI pattern lists in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces)

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may advantageously allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may utilize directional transmit beams to transmit wireless communications to a UE 115. The base station 105 may indicate a TCI state to a UE 115, where the TCI state may correspond to a transmission configuration (e.g., the transmit beam) that is to be utilized by the base station 105 to transmit control information and/or data to the UE 115. A UE 115 in communication with the base station 105 may configure its receiver based on an indicated TCI state.

In some cases, a base station 105 may transmit the same downlink information (e.g., a TB) across multiple TTIs. In such cases, a UE 115 may generate one-bit feedback for the downlink information based on a combination of the transmissions received across the multiple TTIs. The one-bit feedback may indicate whether the UE 115 successfully decoded a transport block from the multiple TTIs. However, such one-bit feedback may not be sufficient feedback for the base station 105. When the base station 105 utilizes multiple TCI states to transmit the same TB in a respective TTI of the multiple TTIs, one-bit feedback cannot indicate which TTI, and corresponding TCI state, the UE 115 was able to successfully decode.

In accordance with the techniques described herein, a UE 115 may generate multi-bit feedback. In some examples, each bit of the feedback may correspond to a TTI for indicating whether the TB was successfully decoded in a particular TTI, or the multi-bit feedback may indicate a TTI number of an earliest TTI of the TTIs the UE 115 was able to decode, or a TTI of the TTIs associated with a preferred TCI state, or any combination thereof. A base station 105 may determine TCI state patterns that correspond to orders in which the base station 105 may apply TCI states across multiple TTIs and may configure a UE 115 with a list of TCI state patterns. Each entry in the list may correspond to a different TCI state pattern. A base station 105 may select an entry from the TCI state pattern list and indicate the selected TCI state pattern to the UE 115. The base station 105 may transmit a grant to the UE 115 indicating that resources have been allocated in the multiple TTIs for transmitting the TB.

The UE 115 may receive the grant and attempt to receive the TB across the multiple TTIs in accordance with the TCI state pattern indicated by the base station 105. The UE 115 determine which TCI state to apply during each of the TTIs in accordance with the indicated TCI state pattern. The UE 115 may attempt to decode the TB in each TTI of the multiple TTIs and may generate feedback to indicate whether the UE 115 was able to successfully decode the TB in at least one TTI, and up to each of the TTIs. The UE 115 may transmit the multi-bit feedback to the base station 105. The base station 105 may use the multi-bit feedback for determining whether to select a different TCI state pattern, and may use the multi-bit feedback for determining whether to change a TCI state and/or an order of TCI states used for communicating a TB to the UE.

Figure 2:
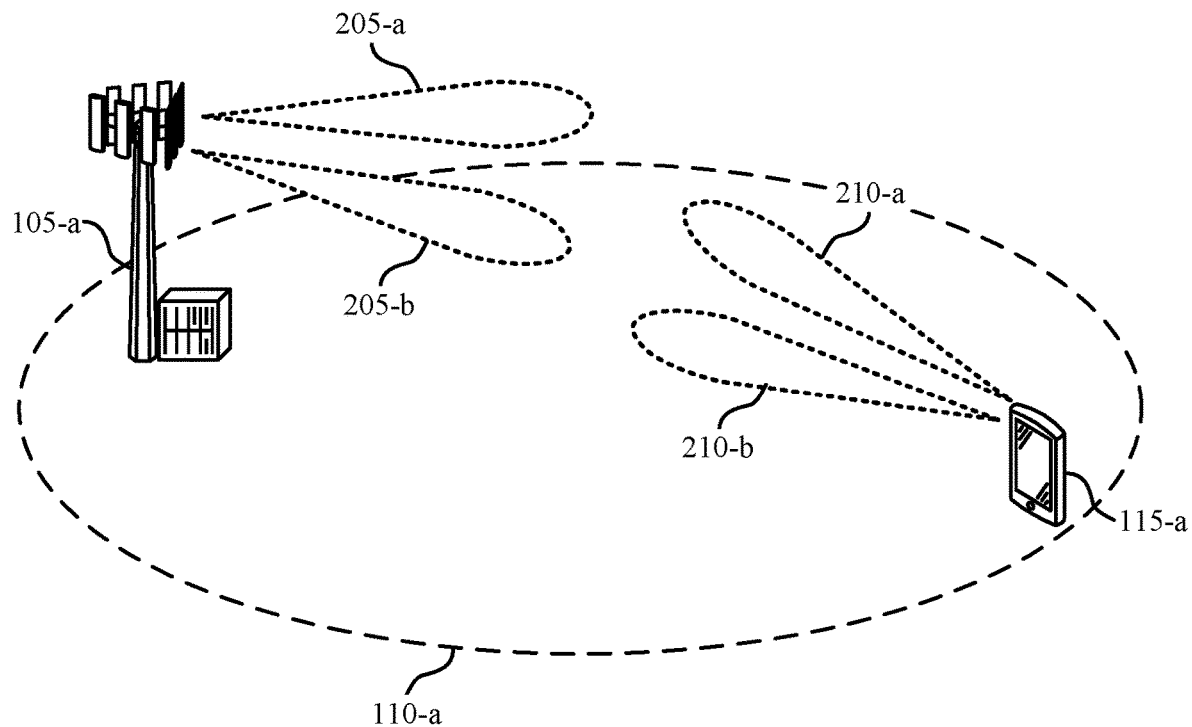

FIG. 2 illustrates an example of a wireless communications system 200 that supports TCI pattern lists in accordance with aspects of the present disclosure. For example, a TCI pattern list may be used for shared channel transmission. In some examples, wireless communications system 200 may implement aspects of wireless communication system 100. Wireless communications system 200 may include a base station 105-a and a UE 115-a within coverage area 110-a, which may be examples of corresponding base stations 105, coverage areas 110, and UEs 115 as described above with reference to FIG. 1. In some cases, base station 105-a may transmit wireless communications to UE 115-a utilizing one or more TCI states that may correspond to respective transmission configurations. In some cases, a TCI state may indicate a transmission configuration of transmit beam 205. For example, a base station 105-a may apply a first TCI state to generate transmit beam 205-a and apply a second TCI to generate transmit beam 205-b.

In some cases, base station 105-a may utilize different TCI states (e.g., different transmit beams 205) to transmit the same TB across multiple TTIs (e.g., slots, mini-slots, or groups of symbols). For example, the base station 105-a may use a particular TCI order over M slots, where M is an integer. In some cases, the base station 105-a may utilize different TCI states when transmitting the same TB in a TDD mode. Beneficially, the different TCI states may assist a transceiver of the UE to perform effective low latency communications by enabling fast and effective switching between the uplink and downlink in TTIs of slots, mini-slots, or groups of symbols configured for TDD mode. In some cases, the base station 105-a may utilize a different TCI state in up to each TTI of a set of TTIs and may transmit the same TB in a respective TTI of the set of TTIs in accordance with one of the different TCI states (e.g., the same TB may be repeated across multiple TCI states). In some examples, different TCI patterns in the TCI pattern list could have different values for the corresponding TTI (e.g., slot M). That is, the number of TTIs need not be the same across the TCI pattern list entries. For example, one TCI pattern could be with 4 TTIs, another with 2 TTI, yet another with 1 TTI, etc. TCI pattern list may be general enough to cover all these and other cases. Base station 105-a may thus configure the UE 115-a with a particular order of TCI states across the multiple TTIs corresponding to the order in which the different transmission configurations are used to transmit the same TB in a respective TTI of the multiple TTIs.

In an example, base station 105-a may transmit a TCI state pattern list to UE 115-a, where entries of the TCI state pattern list correspond to patterns of TCI states that may be utilized on TTIs to transport the same TB across multiple TTIs. Base station 105-a may indicate to UE 115-a a particular TCI state pattern from the list and may transmit a grant to the UE 115-a indicating resources allocated for transmitting the TB in the multiple TTIs. The UE 115-a may attempt to decode the TB in each TTI of the multiple TTIs in accordance with the TCI state pattern indicated by base station 105-a.

In some cases, UE 115-a may determine a reception configuration (e.g., receive beams 210) based on a TCI state pattern indicated in the list. For example, when a TCI state pattern indicates that base station 105-a may utilize a first TCI state (e.g., corresponding to transmit beam 205-a) to transmit a TB, UE 115-a may determine to utilize a first reception configuration (e.g., receive beam 210-a). When a TCI state pattern indicates that base station 105-a may utilize a second TCI state (e.g., corresponding to transmit beam 205-b) to transmit a TB, UE 115-a may determine to utilize a second reception configuration (e.g., receive beam 210-b). In some cases, the process of transmitting the same TB across multiple TTIs using different transmission configurations may improve transmission throughput and enable multi-link operation between base station 105-a and UE 115-a (e.g., through the use of different transmit beams 205). Further, such a process may advantageously give macro-diversity to the transmission of TBs and make the transmissions more resilient to blocking.

UE 115-a may utilize an error detection procedure (e.g., a cyclic redundancy check (CRC)) to determine whether a TB is successfully received during a particular TTI. When UE 115-a receives (e.g., or expects to receive) the same TB across multiple TTIs, UE 115-a may apply the error detection procedure to a combination of the multiple transmissions of the TB.

In conventional techniques, during decoding, UE 115-a may generate a set of LLRs for a particular TTI corresponding to a set of bits of the TB. Because the UE is expecting the same TB in each of the TTIs, the UE may combine LLRs generated for the TB from each TTI and perform a cyclic redundancy check (CRC) using the combined LLRs. If the CRC does not pass for a particular TTI, the UE may combine the accumulated LLRs with the LLRs determined for a next TTI and again perform the CRC. This process may repeat until all TTIs have been checked, or CRC passes. The UE 115-a may generate a one-bit feedback, and the one-bit feedback may indicate whether the UE 115-a was able to successfully decode the TB from the set of TTIs. However, such one-bit feedback may not provide sufficient information to base station 105-a when base station 105-a utilizes different transmission configurations for the transmission of the same TB across multiple TTIs. For instance, the one-bit feedback may not indicate which TTIs are associated with successful or unsuccessful error detection procedures and, therefore, which TCI state and associated transmit beam 205 corresponds to the successful or unsuccessful transmission of the TB.

In accordance with the techniques described herein, UE 115-a may generate multi-bit feedback. In some examples, each bit of the feedback may correspond to a TTI for indicating whether the TB was successfully decoded in a particular TTI, or the multi-bit feedback may indicate a TTI number of an earliest TTI of the TTIs the UE 115 was able to decode, or a TTI of the TTIs associated with a preferred TCI state, or any combination thereof. Such feedback may advantageously indicate which one or more TTIs, and, accordingly, which TCI states corresponding to the one or more TTIs, is associated with successful or unsuccessful decoding of the TB. Based on the multi-bit feedback, base station 105-a may determine a TCI state (e.g., or TCI states) to use for future TB transmissions. Beneficially, the techniques described herein may improve the ability of the base station to select which TCI state or order of TCI states to use for transmissions of a TB in multiple TTIs to enhance reception at the UE, thereby decreasing the amount of retransmissions (e.g., and number of TTIs) for the successful transmission of future communications. Beneficially, an improved order of TCI states may enable a processing unit of the UE to more effectively combine the set of generated LLRs and successfully decode the TB.

Figure 3A:
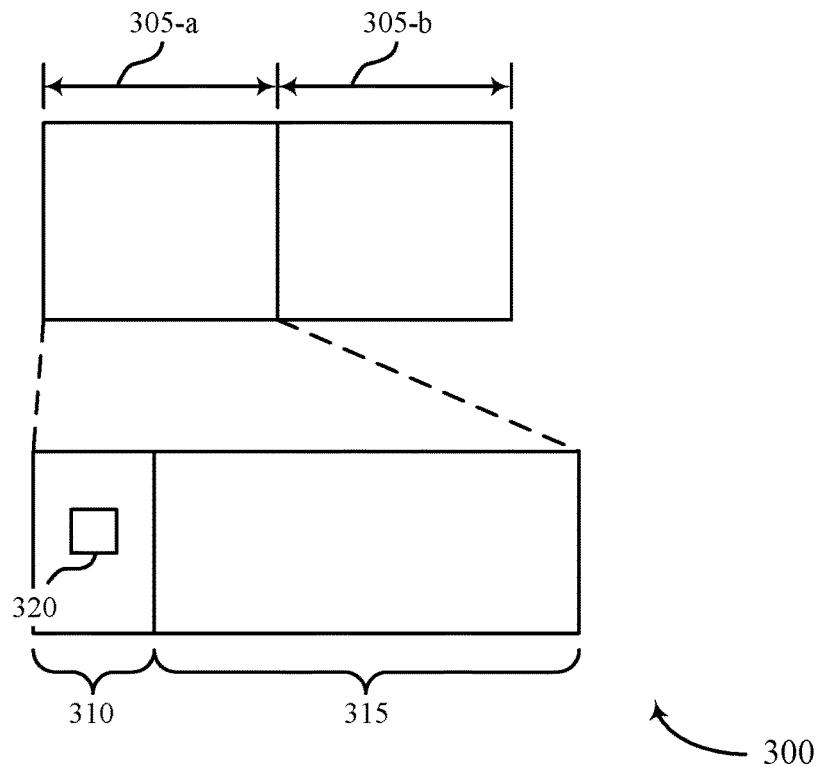
FIGS. 3A and 3B illustrate examples of transmission time interval (TTI) configurations that support TCI pattern lists in accordance with aspects of the present disclosure.
Figure 3B:
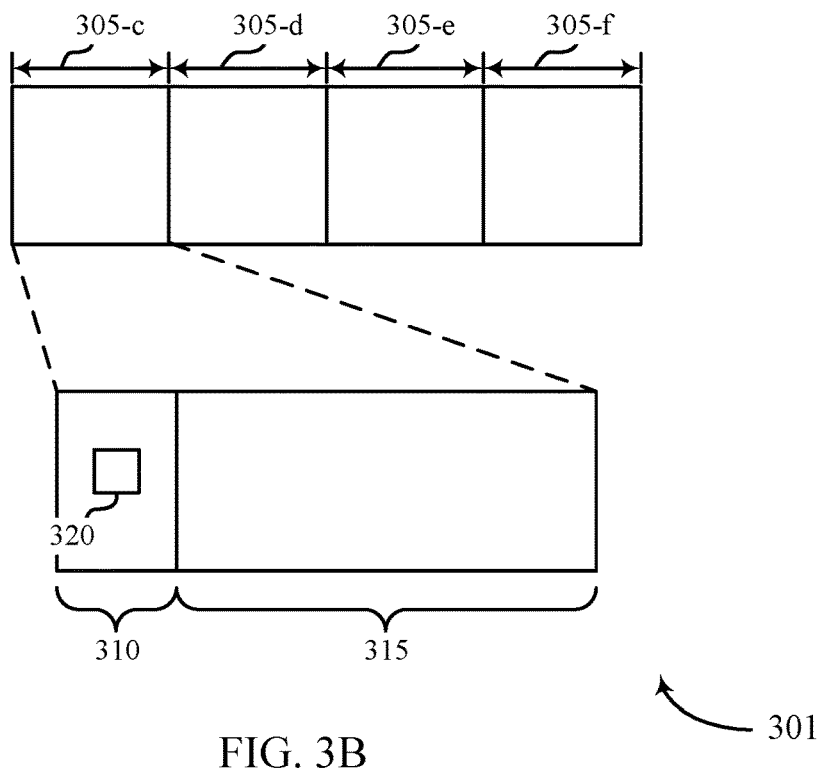

FIGS. 3A and 3B illustrate examples of TCI configurations 300 and 301 that support TCI pattern lists in accordance with aspects of the present disclosure. For example, a TCI pattern list may be used for shared channel transmission. In some examples, TCI configurations 300 and 301 may implement aspects of wireless communications systems 100 and 200.

TCI configuration 300 may include two TTIs 305 (e.g., TTI 305-a and TTI 305-b), according to which a base station 105 and a UE 115 may transmit communications. TTIs 305 may include control region 310 and data region 315. The control region 310 may be, for example, a control resource set (CORESET), a physical downlink control channel (PDCCH), or the like. The data region may be, for example, a shared data channel such as, for example, a physical downlink shared channel (PDSCH). In some cases, data region 315 may be used for transport of a TB. Control region 310 may include resources for transporting a grant 320, and the base station may indicate in grant 320 that the same TB is to be transmitted in multiple TTIs 305. In some examples, downlink control information (DCI) communicated within control region 310 may include grant 320.

As described above with reference to FIG. 2, a base station 105 may transmit the same TB in each TTI of multiple TTIs 305 (e.g., slots, mini-slots, or groups of symbols) according to a particular TCI state pattern such that each TTI 305 may be associated with a TCI state that may vary (e.g., or stay the same) from one TTI 305 to the next. The base station 105 may configure a TCI state pattern list whose entries are associated with different TCI state patterns that may be applied to available TTIs 305. The TCI state pattern list may be communicated, for example, by a base station 105 to a UE 115 in RRC messages. In some cases, a base station 105 may select an entry of the TCI state pattern list that corresponds to a selected pattern of TCI states that are associated with the transmissions of TBs on TTIs 305, and this selection may be indicated in a medium access control-control element (MAC-CE) or DCI.

For example, a base station may utilize two transmission configurations (e.g., two transmit beams) when transmitting a TB on TTIs 305. The base station may configure a TCI state pattern list whose entries correspond to the order in which transmission configurations are utilized on TTIs 305. Each TCI state pattern may identify one or more TCI states and a number of TTIs 305 to which each of the one or more TCI states applies. A configured TCI state pattern list may be {1, 2, 12, 21}, where 1 corresponds to a first TCI state (and the first transmission configuration), and 2 corresponds to a second TCI state (and the second transmission configuration), for example. The first and second entries of the TCI state pattern list, ("1" and "2") include one TCI state. For example, TCI state pattern "1" indicates that a base station 105 may apply the first TCI state to each TTI of a configured multi-TTI transmission, or to apply the first TCI state for a single TTI transmission (e.g., one TB transmitted over one TCI state). The TCI state patterns corresponding to the third and fourth entries of the TCI state list ("12" and "21") include two TCI states (e.g., the first TCI state and the second TCI state). For example, TCI state pattern "12" indicates that a base station 105 may apply the first TCI state to one or more TTIs and apply the second TCI state to one or more TTIs subsequent to the TTIs associated with the first TCI state. Such a TCI state pattern list may advantageously allow a base station flexibility to transition from two TCI states to a single TCI state, and for the configuration of different TCI state patterns.

In an example, the first entry of the TCI state pattern list ("1") may indicate that each TB transmitted in the set of TTIs 305 (e.g., TTI 305-a and TTI 305-b) may be transmitted according to the first TCI state. The second entry of the TCI state order list ("2") may indicate that each TB transmitted in the set of TTIs 305 may be transmitted according to the second TCI state. The third entry of the TCI state order list ("12") may indicate that TBs transmitted on the first half in the set of TTIs 305 (e.g., TTI 305-a) may be transmitted according to the first TCI state while TBs transmitted on the second half in the set of TTIs 305 (e.g., TTI 305-b) may be transmitted according to the second TCI state. The fourth entry of the TCI state order list ("21") may indicate that TBs transmitted on the first half in the set of TTIs 305 (e.g., TTI 305-b) may be transmitted according to the second TCI state while TBs transmitted on the second half in the set of TTIs 305 (e.g., TTI 305-a) may be transmitted according to the first TCI state.

In some cases, a TCI state pattern list may indicate the number of TTIs 305 to which a TCI state pattern of the TCI state pattern list applies. In some examples, the base station 105 may transmit a grant scheduling transmission of a TB in a single TTI, and the base station 105 may indicate a TCI state pattern from the TCI state pattern list for the scheduled TB transmission. In some examples, TCI state patterns of the same TCI state pattern list may apply to different numbers of TTIs 305. For example, a TCI state pattern list {1, 2, 12, 21} may indicate that the first entry ("1") corresponds to one TTI 305 (e.g., such that a base station 105 may transmit one TB across one TTI 305 using the first TCI state) and may indicate that the second entry ("2") corresponds to three TTIs 305 (e.g., such that a base station 105 may transmit the same TB across three TTIs 305 using the second TCI state). The TCI state pattern list may indicate that the third entry ("12") corresponds to two TTIs 305 (e.g., such that a base station 105 may transmit one TB across a first TTI 305 using the first TCI state and transmit the same TB across a second TTI 305 using the second TCI state) and that the fourth entry ("21") corresponds to four TTIs 305 (e.g., such that a base station 105 may transmit the same TB across a first and a second TTI 305 using the first TCI state and transmit the same TB across a third and a fourth TTI 305 using the second TCI state).

A base station 105 may indicate how TTIs 305 are associated with TCI states by indicating the selected entry of a TCI state pattern list to a UE 115. Further, such an indication may allow the UE 115 to configure its reception procedures (e.g., utilize different receive beams) to enhance the reception of transmitted TBs. For example, when a base station 105 indicates that TCI state pattern "12" may be utilized for TTIs 305-a and 305-b, a UE 115 may utilize a first receive beam that corresponds to the first TCI state (e.g., first transmit beam corresponding to TCI state 1) during TTI 305-a and utilize a second receive beam that corresponds to the second TCI state during TTI 305-b (e.g., first transmit beam corresponding to TCI state 2).

A UE 115 may perform an error detection procedure, such as a CRC, to determine whether a TB was successfully decoded from a particular TTI. A CRC process may include a base station 105 and a UE 115 being configured with the same error detection algorithm, such a CRC algorithm. Before transmitting a TB, a base station 105 may apply the CRC algorithm to a codeword to generate a set of error detection bits (e.g., CRC bits) (e.g., according to a logical operation such as "exclusive or"). The transport block may include the codeword and the set of error detection bits. Upon receiving the TB from the base station 105, the UE 115 may decode the TB to obtain a received codeword (e.g., based on determined LLRs) and received error detection bits. The UE 115 may apply the error detection algorithm to the received codeword to generate calculated error detection bits. The UE 115 may determine that the TB was successfully decoded if the calculated error detection bits matches the received error detection bits. If calculated and received error detection bits do not match, the UE 115 may identify that the TB did not pass error detection.

The UE 115 may generate a feedback bit with a first value (e.g., 1) when the CRC procedure passes (e.g., when one or more TTIs 305 included a successfully-decoded TB), and the UE 115 may generate a feedback bit with a second value (e.g., 0) when the CRC procedure fails (e.g., when none of the TTIs 305 included a successfully-decoded TB).

As noted above, the conventional process of generating a single feedback bit for a same TB transmitting in multiple TTIs may not provide enough information to a base station 105 for determining which TTI passed error detection. Such a one-bit indication does not indicate which specific TTI 305 of TTIs 305-a, 305-b, or both, the UE 115 was able to successfully decode (e.g., TTI 305-b). Thus, the base station 105 may be unable to determine which TCI state is associated with successful TB transmission. The base station 105 thus may inefficiently determine which TCI state to utilize for TB transmission when the base station 105 may utilize multiple TCI states across multiple TTIs.

By utilizing multi-bit feedback as described herein, a base station 105 may receive feedback that corresponds to each TTI and associated TCI state, which may aid in TCI selection. In an example, the base station 105 may configure UE 115 to generate multi-bit feedback having a feedback bit for each TTI 305 in which the UE 115 attempted to decode the TB. For example, when two TTIs 305 are utilized to transmit a TB (e.g., TTI 305-a and TTI 305-b), a UE 115 may generate a first feedback bit for TTI 305-a and a second feedback bit for TTI 305-b. The UE 115 may generate the first feedback bit according to an individual error detection procedure (e.g. CRC) performed for TTI 305-a and may generate the second feedback bit according to an individual error detection procedure performed from TTI 305-b.

In the case when the UE 115 determines that decoding of a TB in each of TTI 305-a and TTI 305-b does not pass error detection, the UE 115 may generate feedback that has a first state (e.g., 00). In the case when the UE 115 determines that decoding of a TB in TTI 305-a does not pass error detection and that decoding of a TB in TTI 305-b passes error detection, the UE may generate feedback that has a second state (e.g., 01). In the case when the UE 115 determines that decoding of a TB in TTI 305-a passes error detection and that decoding of a TB in TTI 305-b does not pass error detection, the UE may generate feedback that has a third state (e.g., 10). In the case when the UE 115 determines that decoding of a TB in each of TTI 305-a and TTI 305-b passes error detection, the UE 115 may generate feedback that has a fourth state (e.g., 11).

The multi-bit feedback may advantageously provide an indirect indication to the base station 105 of which TCI state is satisfactory or better (e.g., associated with successfully-decoded transmission). For example, if the multi-bit feedback indicates that a UE is able to successfully decode a TB transmitted in accordance with a particular TCI state, then the base station 105 may associate the particular TCI state with successful TB transmission. Conversely, if the multi-bit feedback indicates that a UE is unable to successfully decode a TB transmitted in accordance with a particular TCI state, then the base station 105 may associate the particular TCI state with unsuccessful TB transmission. The base station 105 may determine to utilize a TCI state associated with successful TB transmission for future transmissions, and the base station 105 may determine to not utilize a TCI state associated with unsuccessful TB transmission for future transmissions.

In some examples, the multi-bit feedback may advantageously provide a direct indication of which TCI state is satisfactory or better (e.g., which TCI state is associated with successful transmission or which TCI state is associated with the strongest received signal quality or received signal power). For example, a UE 115 may generate multi-bit feedback such that one bit of the feedback may have a first value (e.g., 1) that corresponds to the most satisfactory TCI state while the remaining bits have a second value (e.g., 0). When a UE 115 successfully decodes a TB on only one TTI among a multi-TTI transmission, the UE 115 may generate multi-bit feedback such that the bit that corresponds to the successfully received TTI is assigned the first value while the remaining bits are assigned the second value. In some examples, the multi-bit feedback may have fewer bits than the number of TTIs, and the multi-bit feedback may include an indicator that may be used to index a table. The indicator may indicate, for example, a particular TTI number or set of TTIs numbers for which decoding of the TB in the indicated TTIs was successful, a preferred TCI state, an earliest TTI of the set of TTIs that was successfully decoded, or any combination thereof.

When a UE 115 successfully decodes multiple TBs across multiple TTIs among a multi-TTI transmission, the UE 115 may determine the signal quality or signal strength associated with each successfully decoded TB (e.g., the UE 115 may determine a signal-to-noise ratio for each TTI). The UE 115 may choose the TTI associated with the highest signal to noise ratio (SNR) signal to interference plus noise ratio (SNR), signal quality, for example, as the most satisfactory TTI, and the UE 115 may generate feedback such that the bit corresponding to the best TTI may be assigned the first value while the rest of the feedback bits are assigned the second value. For example, feedback in the form "0010" may indicate that the third TTI of a multi-TTI transmission was the most satisfactory TTI decoded by a UE 115. By knowing which TCI states correspond to the transmissions the UE is able to successfully decode, a base station 105 may manage the transmission configuration patterns it utilizes for future transmissions to enhance the ability of the UE to successfully decode those transmissions.

In some cases, a UE 115 may generate multi-bit feedback that indicates a TTI number that corresponds to the first successfully-decoded TTI 305. In some examples, the multi-bit feedback may indicate a preferred TCI state and/or a TTI number of a preferred TCI state (e.g., associated with a TTI of the multiple TTIs in which decoding of the TB is successful). For example, A UE 115 may receive a multi-TTI transmission across TTIs 305-*c* (e.g., with a TTI number equal to 1), 305-*d* (e.g., with a TTI number equal to 2), 305-*e* (e.g., with a TTI number equal to 3), and 305-*f* (e.g., with a TTI number equal to 4) and may successfully decode the TBs associated with TTI 305-*d* and TTI 305-*f*. The UE 115 may generate feedback that indicates that the TTI 305-*d* corresponds to the first successfully-decoded TB 305 (e.g., by generating a binary value "10" as feedback to indicate the TTI number associated with the first successfully-decoded TB). In some cases, a UE 115 may determine that the TTI 305-*f* is a preferred TTI 305 (e.g., based on an SNR comparison of a transmission received within TTI 305-*d* and TTI 305-*f*) and generate feedback that indicates that TTI 305-*f*, or a TCI state used within TTI 305-*f*, is the preferred TTI 305 or a preferred TCI state (e.g., by generating the binary value "100" as feedback to indicate the TTI number associated with TTI 305-*f*, by generating a binary value as feedback to indicate a particular TCI state, etc.). In some examples, the length of the multi-bit feedback may have fewer bits than the number of TTIs, and the multi-bit feedback may be an indicator used to index a table for identifying a particular TTI and/or TCI state, thereby reducing signaling overhead associated with transmitting the multi-bit feedback.

In some examples, a base station 105 may determine to change the selected TCI state pattern based on multi-bit feedback transmitted by a UE 115. In the example TCI state pattern list of FIG. 3A (11, 2, 12, 211), a base station 105 may select the third entry of the TCI state pattern ("12") list to indicate that a TB may be transmitted according to a first transmission configuration during a first TTI (e.g., TTI 305-*a*) and the same TB may be transmitted according to a second transmission configuration during a second TTI (e.g., TTI 305-*b*). In an example, a UE 115 may successfully decode the TB during the second TTI, but not the first TTI, and accordingly generate multi-bit feedback to indicate the successful reception (e.g., transmit "01" as feedback). The base station 105 may, in an example, determine to change the selected TCI state pattern for a following multi-TTI scheduling to the pattern that utilizes only the second transmission configuration for each TTI 305 (e.g., by selecting the second entry of the example TCI state pattern list ("2")). In some examples, the base station 105 may determine to change the selected TCI state pattern to the pattern that utilizes the second transmission configuration for the first TTI and the first transmission configuration for the second TTI (e.g., the fourth entry of the example TCI state pattern list ("21")).

In some cases, the techniques described herein may apply to a TCI state pattern list that includes more than two TCI states. For example, a TCI state pattern list may be {1324, 4112, 3421, 3231}, where 3 may correspond to a third TCI state and 4 may correspond to a fourth TCI state. In some cases, the TCI state pattern list may be applied to TTIs 305-*c*, 305-*d*, 305-*e*, and 305-*f*. In such a case, the first entry of the TCI state pattern list ("1324") may indicate that a TB may be transmitted according to the first TTI state on TTI 305-*c*, the same TB may be transmitted according to the third TCI state on TTI 305-*d*, the same TB may be transmitted according to the second TCI state on TTI 305-*e*, and the same TB may be transmitted according to the fourth TCI state on TTI 305-*f*. The second entry of the TCI state pattern list ("4112") may indicate that a TB may be transmitted according to the fourth TTI state on TTI 305-*c*, the same TB may be transmitted according to the first TCI state on TTIs 305-*d* and 305-*d*, and the same TB may be transmitted according to the second TCI state on TTI 305-*f*. The third entry of the TCI state pattern list ("3421") may indicate that a TB may be transmitted according to the third TTI state on TTI 305-*c*, the same TB may be transmitted according to the fourth TCI state on TTI 305-*d*, the same TB may be transmitted according to the second TCI state on TTI 305-*e*, and the same TB may be transmitted according to the first TCI state on TTI 305-*f*. The fourth entry of the TCI state pattern list ("3231") may indicate that a TB may be transmitted according to the third TCI state on TTIs 305-*c* and 305-*e*, the same TB may be transmitted according to the second TCI state on TTI 305-*d*, and the same TB may be transmitted according to the first TCI state on TTI 305-*f*.

As described above, a TCI state pattern list may indicate the number of TTIs 305 to which a TCI state pattern of the TCI state pattern list applies. In some examples, TCI state patterns of the same TCI state pattern list may apply to different numbers of TTIs 305. For example, a TCI state pattern list {1324, 4112, 3421, 3231} may indicate that the first entry and the second entry ("1324" and "4112") correspond to four TTIs 305 while the third entry and the fourth entry ("3421" and "3231") correspond to eight TTIs 305, for example.

In some cases, a base station 105 may select the first entry of the TCI state pattern list and transmit this selection to a UE 115 to indicate that the base station 105 may transmit a TB according to the first TCI state during TTI 305-*a*, transmit the same TB according to the third TCI state during TTI 305-*b*, transmit the same TB according to the second TCI state during TTI 305-*c*, and transmit the same TB according to the fourth TCI state during TTI 305-*d*. It should be understood that a TCI state pattern list may comprise any number of entries that are associated with TCI state patterns that include any number of TCI states, and the TCI state patterns may be applied to any number of TTIs 305. In some examples, the TCI state pattern list may indicate a number TTIs per TCI state pattern (e.g., a total number of TTIs for a first TCI state pattern in the list, a total number of TTIs for a second TCI state pattern in the list, etc.).

Figure 4:
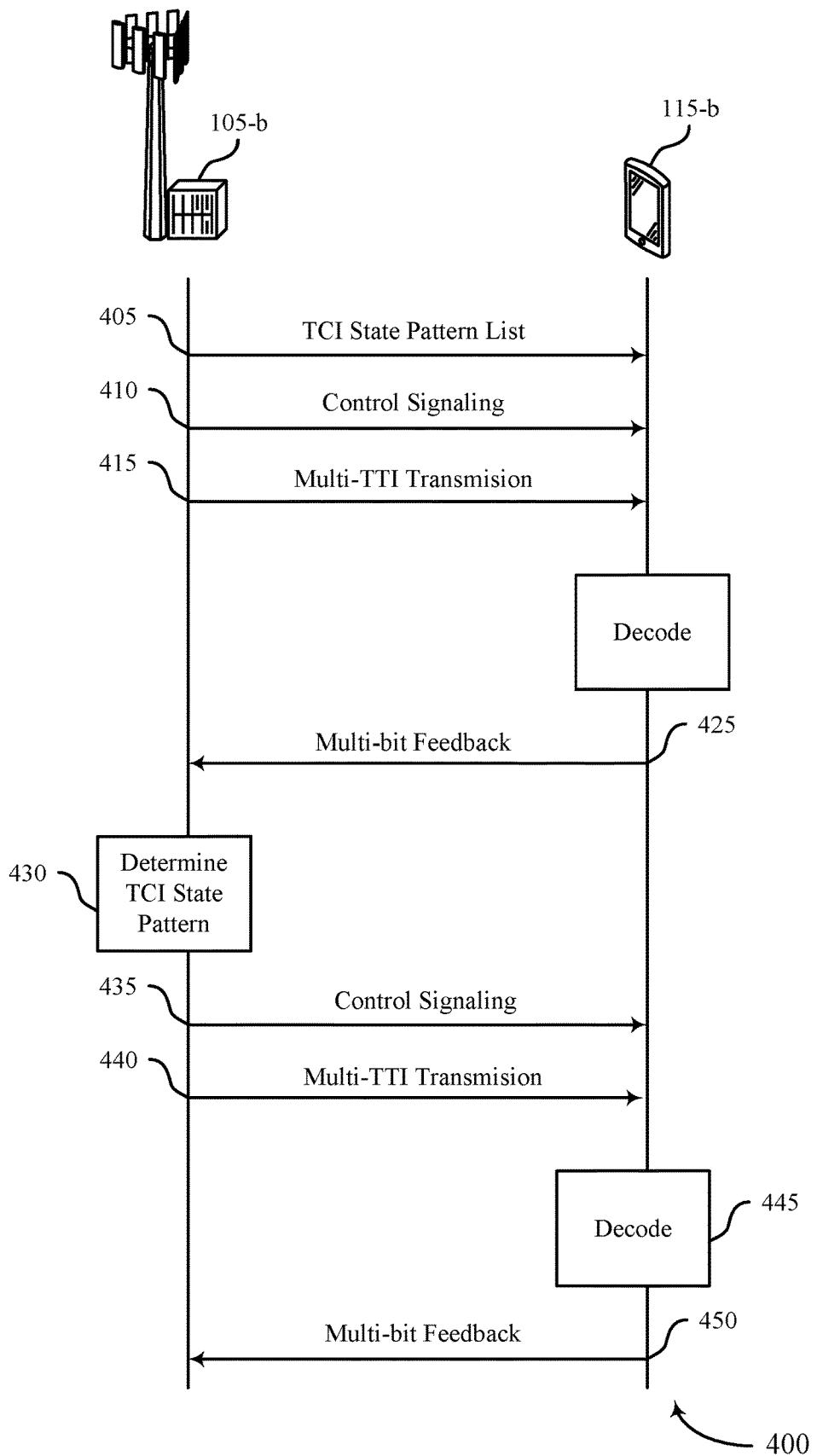
FIG. 4 illustrates an example of a process flow that supports TCI pattern lists in accordance with aspects of the present disclosure.

Based on the indication of the TCI state pattern list, the UE 115 may set its reception configuration during each TTI 305 to efficiently receive the respective TB transmissions (e.g., by utilizing a receive beam that corresponds to the transmit beam indicated by the selected TCI state pattern for a particular TTI). The UE 115 may generate multi-bit feedback, where the multi-bit feedback may indicate which TTI 305 is associated with successful TB reception. For example, feedback "1010" may indicate that TTI 305-c and TTI 305-e are associated with successful TB transmission, while TTI 305-d and TTI 305-f are associate with unsuccessful TB transmission. Feedback "0101" may indicate that TTI 305-d and TTI 305-f are associated with successful TB transmission, while TTI 305-c and TTI 305-e are associated with unsuccessful TB transmission FIG. 4 illustrates an example of a process flow 400 that supports TCI pattern lists in accordance with aspects of the present disclosure. For example, a TCI pattern list may be used for shared channel transmission. In some examples, process flow 400 may implement aspects of wireless communications systems 100 and 200. Process flow 400 may include a base station 105-b and a UE 115-b, which may be example of corresponding base stations 105 and UEs 115, as described above with reference to FIGS. 1-2. It is noted that the techniques discussed in FIG. 4 are with reference to a multi-TTI transmission, and the same techniques may be applied for a single TTI transmission.

At 405, base station 105-b may transmit a TCI state pattern list to UE 115-b. As described above with reference to FIG. 3A, a TCI state pattern list may indicate the pattern of TCI states that may be utilized by base station 105-b to transmit TBs in a set of TTIs. Each entry included in a TCI state pattern list may correspond to a different TCI state pattern. In the example TCI state pattern list as described with reference to FIG. 3B ({1324, 4112, 3421, 3231}), the second entry of the TCI state pattern list ("4112") may indicate that base station 105-b may utilize a fourth transmission configuration during a first TTI, a first transmission configuration during a second TTI and a third TTI, and a second transmission configuration during a fourth TTI. In some cases, the TCI state pattern list may be indicated in RRC signaling. In some examples, each TCI state pattern may indicate the number of TTIs to which each TCI state pattern applies. For example, a TCI state pattern may indicate that the same TCI state pattern applies to all TTIs or a first subset of the TTIs. In some examples, the TCI state pattern may indicate that the first subset of the TTIs includes a first defined number of TTIs, and that a second subset of the TTIs includes a second defined number of TTIs, where the first and second defined numbers may be the same or may differ. In some examples, the TCI state pattern may define a different TCI state for up to each TTI.

At 410, base station 105-b may transmit a control signaling to UE 115-b. The control signaling may include, for example, a downlink control information (DCI), a MAC-CE, or the like, to indicate the TCI state pattern from the list configured at 405. In some examples, the control signaling may include a multi-TTI grant that indicates that base station 105-b may utilize multiple TTIs to transmit the same TB in each TTI. As described above with reference to FIG. 3A, a multi-TTI grant may be included in the control region of a TTI that includes a TB (e.g., the TB that is to be transmitted across the multiple TTIs). In some cases, the multi-TTI grant may be transmitted before the set of TTIs that include the same TB (e.g., in a TTI prior to the first TTI that includes the TB).

In some examples, base station 105-b may determine a first TCI state pattern to apply to one or more TTIs when transmitting a TB across the one or more TTIs. Base station 105-b may select an entry of a configured TCI state pattern list that corresponds to the selected TCI state pattern and indicate the selected entry to UE 115-b via the control signaling. UE 115-b may configure and/or alter its reception configuration for each TTI scheduled by the multi-TTI grant based on the TCI state pattern indicated in the control signaling. For example, UE 115-b may advantageously change a receive beam to better match the transmit beam that base station 105-b may utilize during a given TTI, as indicated by the selected TCI state pattern.

In some cases, base station 105-b may indicate the selected TCI state pattern via the multi-TTI grant. Base station 105-b may transmit the multi-TTI grant via one or more of DCI signaling. In some case the base station 105-b may indicate the selected TCI state pattern in other types of control signaling, such as a MAC-CE, instead of or in addition to indicating the selected TCI state pattern in the multi-TTI grant.

At 415, base station 105-b may transmit a multi-TTI transmission via a shared data channel (e.g., a PDSCH). In some cases, the data region of each TTI of the multi-TTI transmission includes the same TB. Base station 105-b may transmit each TTI of the multi-TTI transmission according to a TCI state pattern indicated to the UE 115-a at 410. The UE 115-b may determine which TCI state to apply for each TTI of the multi-TTI transmission based on the TCI state pattern indicated by the base station 105-b at 410. For example, the UE 115-b may identify a TCI state for a particular TTI based on the TCI state pattern, may identify which receive beam of a use of a set of receive beams to use corresponding to the identified TCI state, and may receive a transmission of the multi-TTI transmission within the TTI using the identified receive beam. In some cases, the TCI state pattern may include multiple TCI states, and the UE 115-b may identify which receive beam to use for a particular TTI in accordance with a TCI state indicated by the TCI state pattern that corresponds to the particular TTI. The UE 115-b may use a different receive beam on up to each TTI in accordance with the TCI state pattern.

At 420, UE 115-b may decode the multi-TTI transmission. As described above with reference to FIGS. 2 and 3, UE 115-b and base station 105-b may utilize an error detection procedure that may involve base station 105-b applying an error detection algorithm (e.g., a CRC algorithm) to codeword to generate one or more error detection bits (e.g., CRC bits), forming a TB that includes the codeword and the one or more error detection bits, and transmitting the TB in multiple TTIs. UE 115-b may decode the multi-TTI transmission on a TTI-by-TTI basis (e.g., UE 115-b may sequentially decode the TB of each TTI in the order that UE 115-b receives transmissions in the TTIs).

At 425, UE 115-b may generate and transmit feedback to base station 105-b, where the feedback may indicate whether UE 115-b successfully decoded the TB in at least one TTI of the multi-TTI transmission (e.g., where the TB s across the multiple TTIs are the same TB). In some cases, the feedback may be a multi-bit feedback such that each bit of the multi-bit feedback corresponds to one of the multiple TTIs of the multi-TTI transmission. The multi-bit feedback may indicate whether the UE 115-b was able to successfully decode the TB in at least one TTI, and up to each TTI, of the multiple TTIs.

In an example, the multi-bit feedback may be generated sequentially according to the order in which TTIs are received. For example, when base station 105-*b* transmits the same TB across two TTIs, the first bit of the multi-bit feedback may correspond to the TTI that UE 115-*b* receives first, and the second bit of the multi-bit feedback may correspond to the TTI that UE 115-*b* receives second. In some cases, multi-bit feedback may include information such as on which TTI passed CRC or a preferred TCI state (e.g., the TCI state that corresponds to successful TB decoding or has a satisfactory and/or best signal quality, SNR, SINR, or the like). For example, when base station 105-*b* transmits the same TB across two TTIs such that only the second TTI corresponds to successful decoding at UE 115-*b*, UE 115-*b* may transmit a multi-bit feedback indication that the second TTI is associated with successful decoding. In some examples, the multi-bit feedback may indicate a preferred TCI state and/or a TTI number of a preferred TCI state (e.g., associated with a TTI of the multiple TTIs in which decoding of the TB is successful).

At 430, base station 105-*b* may determine whether to adjust which TCI state pattern to apply based on the multi-bit feedback received from UE 115-*b*. In the example TCI state pattern list of FIG. 3A ({1, 2, 12, 21}), base station 105-*b* may select the third entry of the TCI state pattern (12) list to indicate that a TB may be transmitted according to a first transmission configuration during a first TTI and the same TB may be transmitted according to a second transmission configuration during a second TTI. UE 115-*b* may successfully decode the TB during the second TTI, but not the first TTI, and accordingly generate multi-bit feedback to indicate the successful decoding (e.g., transmit "01" as feedback). Base station 105-*b* may determine to change the selected TCI state pattern for a following multi-TTI scheduling to the pattern that utilizes only the second transmission configuration for each TTI (e.g., by selecting the second entry of the example TCI state pattern list of FIG. 3A). In some examples, base station 105-*b* may determine to change the selected TCI state pattern to the pattern that utilizes the second transmission configuration for the first TTI and the first transmission configuration for the second TTI (e.g., the fourth entry of the example TCI state pattern list of FIG. 3A).

In some examples, the base station 105-*b* may determine to use a different TCI state pattern, or change an order in which TCI states are applied to respective TTIs based on the multi-bit feedback received from UE 115-*b*. For example, the base station 105-*b* may determine, based on the multi-bit feedback, negative acknowledgements occur for a first TCI state at a higher rate than for a second TCI state. Thus, the base station 105-*b* may select a TCI pattern that reduces or eliminates use of the first TCI state, and/or increases use of the second TCI state. In some examples, the base station 105-*b* may maintain a statistical metric (e.g., an average) for negative acknowledgments and/or positive acknowledgments for each of the TCI states based on instances of the multi-bit feedback received over time, and the base station 105-*b* may use the statistical metric(s) for selecting the TCI state pattern.

At 435, base station 105-*b* may transmit control signaling that may include a multi-TTI grant, where the multi-TTI grant may indicate that base station 105-*b* may retransmit the multi-TTI transmission including the same TB (e.g., due to the multi-bit feedback indicating a negative acknowledgment for all TTIs), or may transmit a new TB in multiple TTIs (e.g., due to the multi-bit feedback indicating a positive acknowledgment for at least one of the TTIs). In some cases, the control signaling, such as DCI or a MAC-CE, may include an updated selected TCI state pattern. Base station 105-*b* may select the updated selected TCI state pattern based on the multi-bit feedback received from UE 115-*b*. In the cases where base station 105-*b* determines not to change the TCI state pattern, base station 105-*b* may not transmit an updated selected TCI state pattern in the control signaling (via DCI, a MAC-CE, or the like), and instead the control signaling may include a multi-TTI grant. In an example, when the control signaling does not indicate an update to the selected TCI state pattern, the UE 115-*a* may expect that the base station 105-*b* will continue to use the prior TCI state pattern for transmission of the TB scheduled in the multi-TTI grant.

At 440, base station 105-*b* may transmit the multi-TTI transmission via a shared data channel (e.g., a PDSCH) according to the multi-TTI grant of 435. UE 115-*b* may decode the retransmitted multi-TTI transmission and generate feedback for the retransmitted multi-TTI transmission at 445 and 450, respectively. Operations 440, 445, and 450 may follow the same processes as described above with reference to operations 415, 420, and 425, respectively, which may allow for a repetitive process of UE 115-*b* multi-bit feedback to base station 105-*b* such that base station 105-*b* may determine whether to change TCI state patterns to enhance TB transmission across multiple TTIs.

The process of base station 105-*b* updating a selected TCI state pattern based on multi-bit feedback from UE 115-*b* may allow base station 105-*b* to advantageously select a satisfactory or better transmission configuration (e.g., transmission configurations corresponding to successfully decoded TBs) for future TB transmissions.

Figure 5:
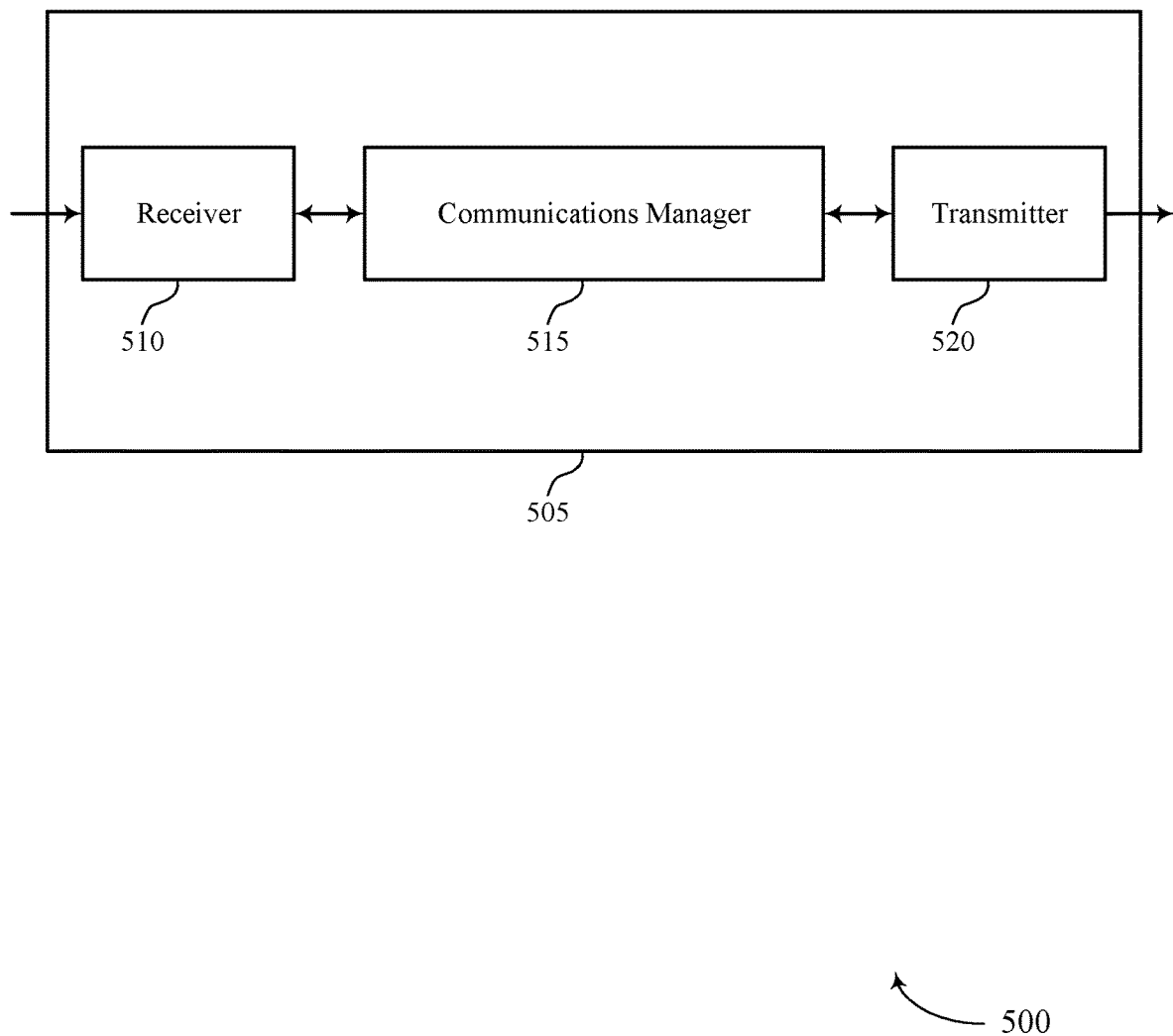
FIGS. 5 and 6 show block diagrams of devices that support TCI pattern lists in accordance with aspects of the present disclosure.

FIG. 5 shows a block diagram 500 of a device 505 that supports TCI pattern lists in accordance with aspects of the present disclosure. For example, a TCI pattern list may be used for shared channel transmission. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to a TCI pattern list for shared channel transmission). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration message indicating a list that includes a set of TCI state patterns, receive control signaling indicating a first TCI state pattern of the set of TCI state patterns, receive, via a shared data channel, a TB in each TTI of a set of TTIs in accordance with the first TCI state pattern, and transmit multiple bit feedback indicating at least one TTI of the set of TTIs for which decoding of the TB was successful. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
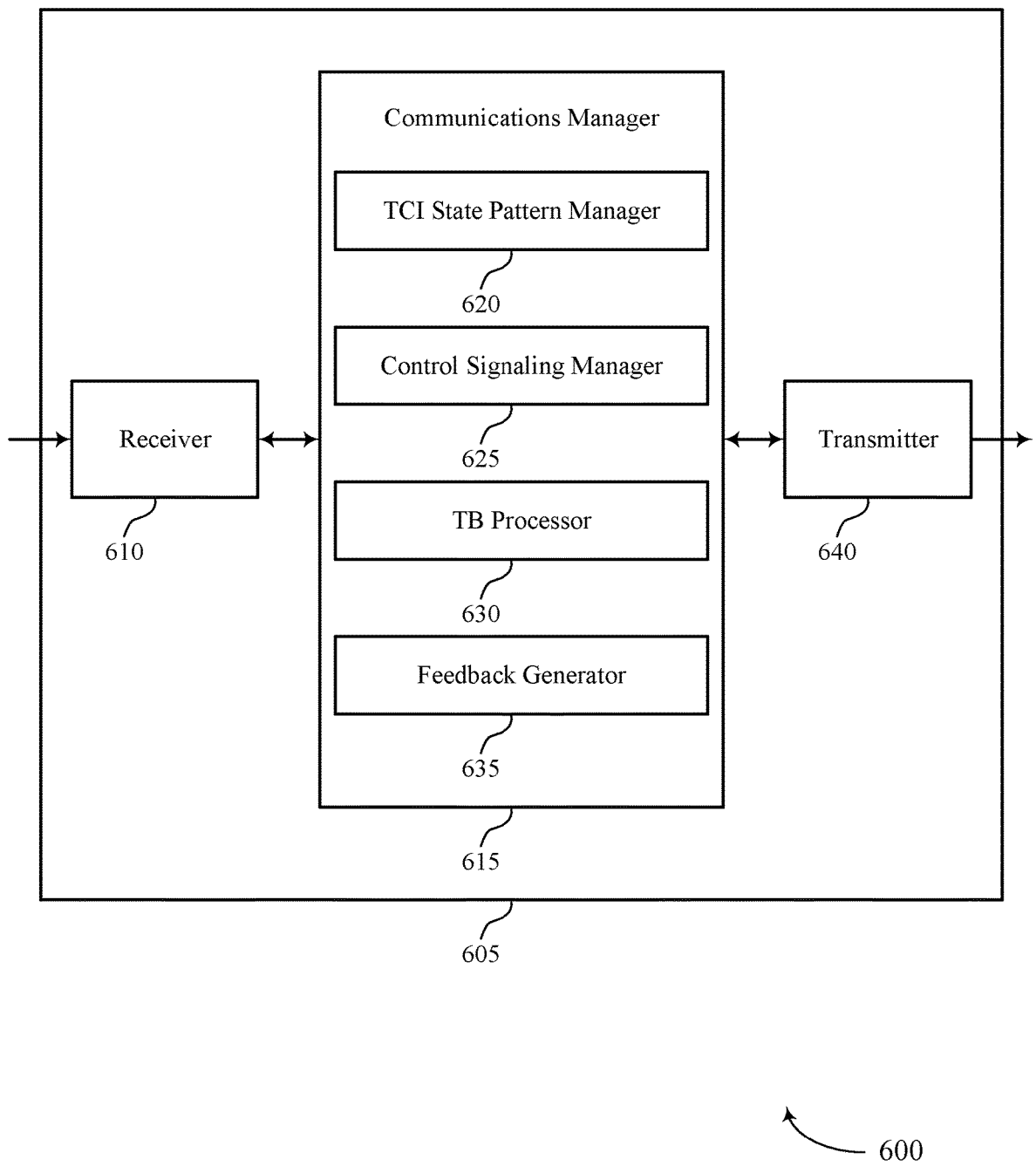

FIG. 6 shows a block diagram 600 of a device 605 that supports TCI pattern lists in accordance with aspects of the present disclosure. For example, a TCI pattern list may be used for shared channel transmission. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to a TCI pattern list for shared channel transmission). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a TCI state pattern manager 620, a control signaling manager 625, a TB processor 630, and a feedback generator 635. The communications manager 615 may be an example of aspects of the communications manager 810 described herein.

The TCI state pattern manager 620 may receive a configuration message indicating a list that includes a set of a TCI state patterns. The control signaling manager 625 may receive control signaling indicating a first TCI state pattern of the set of TCI state patterns. The TB processor 630 may receive, via a shared data channel, a TB in each TTI of a set of TTIs in accordance with the first TCI state pattern.

The feedback generator 635 may transmit multiple bit feedback indicating at least one TTI of the set of TTIs for which decoding of the TB was successful. In some examples, the multiple bit feedback may indicate whether decoding of the TB was successful for at least one TTI of the set of TTIs. In some examples, the multiple bit feedback may indicate an earliest TTI of the set of TTIs in which decoding of the TB was successful. In some examples, the multiple bit feedback may indicate a TTI number of the at least one TTI (e.g., the earliest TTI) in which decoding of the TB was successful. In some examples, the multiple bit feedback may indicate a TTI number of associated with a preferred TTI and/or TCI state (e.g., associated with a transmission having a highest SNR or best signal metric).

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
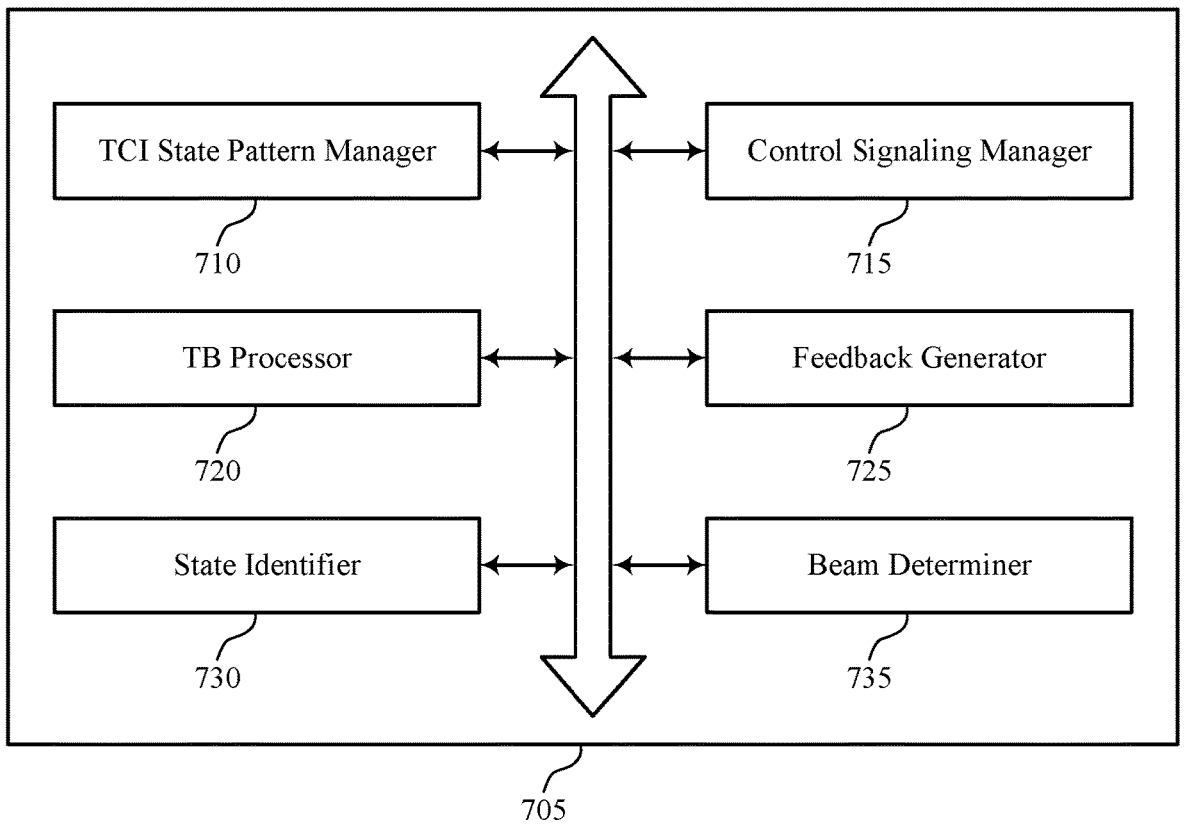
FIG. 7 shows a block diagram of a communications manager that supports TCI pattern lists in accordance with aspects of the present disclosure.

FIG. 7 shows a block diagram 700 of a communications manager 705 that supports TCI pattern lists in accordance with aspects of the present disclosure. For example, a TCI pattern list may be used for shared channel transmission. The communications manager 705 may be an example of aspects of a communications manager 515, a communications manager 615, or a communications manager 810 described herein. The communications manager 705 may include a TCI state pattern manager 710, a control signaling manager 715, a TB processor 720, a feedback generator 725, a state identifier 730, and a beam determiner 735. Each of these modules may communicate, directly or indirectly, with one another (e.g., via one or more buses).

The TCI state pattern manager 710 may receive a configuration message indicating a list that includes a set of TCI state patterns. In some examples, the TCI state pattern manager 710 may receive an RRC message indicating the list. In some cases, each TCI state pattern of the set of TCI state patterns indicates one or more TCI states and a number of TTIs to which each of the one or more TCI states applies. In some instances, the first TCI state pattern indicates a same TCI state for each TTI of the set of TTIs. In some aspects, the first TCI state pattern indicates a first TCI state for a first TTI subset of the set of TTIs and a second TCI state for a second TTI subset of the set of TTIs.

The control signaling manager 715 may receive control signaling indicating a first TCI state pattern of the set of TCI state patterns. In some examples, the control signaling manager 715 may receive second control signaling indicating a second TCI state pattern of the set of TCI state patterns, where the second TCI state pattern indicates a TCI state or an order for a set of TCI states that differs from a TCI state or an order for the set of TCI states indicated in the first TCI state pattern. In some cases, the second control signaling is received in response to the multiple bit feedback. In some instances, the control signaling is DCI or a MAC CE.

The TB processor 720 may receive, via a shared data channel, a TB in each TTI of a set of TTIs in accordance with the first TCI state pattern. In some examples, the TB processor 720 may receive a retransmission of the TB in each TTI of a second set of TTIs in accordance with the second TCI state pattern. In some cases, the TB processor 720 may receive a second TB in each TTI of a second set of TTIs in accordance with the second TCI state pattern. In some instances, the TB processor 720 may receive a grant scheduling transmission of the TB during each TTI of the set of TTIs.

The feedback generator 725 may transmit multiple bit feedback indicating at least one TTI of the set of TTIs for which decoding of the TB was successful. In some examples, the feedback generator 725 may transmit second multiple bit feedback indicating whether decoding of the retransmission of the TB was successful for at least one TTI of the second set of TTIs. In some cases, the feedback generator 725 may transmit second multiple bit feedback indicating whether decoding of the second TB was successful for at least one TTI of the second set of TTIs. In some instances, each bit of the multiple bit feedback corresponds to a respective TTI of the set of TTIs. In some aspects, the multiple bit feedback indicates a particular TCI state of a set of TCI states. In some examples, the multiple bit feedback includes a TTI number of the at least one TTI. In some cases, the multiple bit feedback indicates an earliest TTI of the set of TTIs for which decoding of the TB was successful.

The state identifier 730 may identify a first TCI state for a first TTI of the set of TTIs and a second TCI state for a second TTI of the set of TTIs based on the first TCI state pattern. In some examples, the state identifier 730 may identify a first receive beam based on the first TCI state and a second receive beam based on the second TCI state.

The beam determiner 735 may receive the TB during the first TTI using the first receive beam and the TB during the second TTI using the second receive beam.

Figure 8:
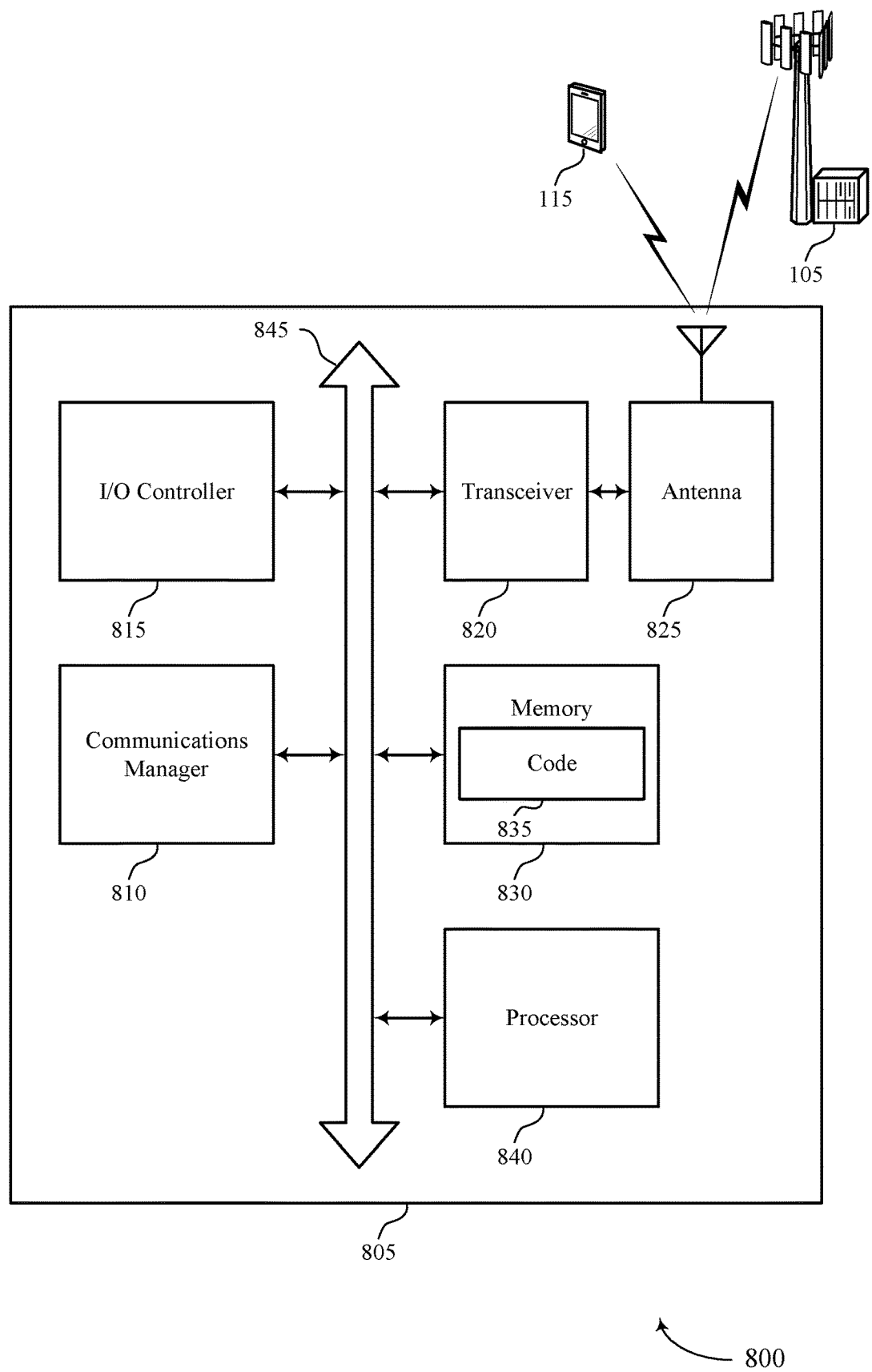
FIG. 8 shows a diagram of a system including a device that supports TCI pattern lists in accordance with aspects of the present disclosure.

FIG. 8 shows a diagram of a system 800 including a device 805 that supports TCI pattern lists in accordance with aspects of the present disclosure. For example, a TCI pattern list may be used for shared channel transmission. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration message indicating a list that includes a set of TCI state patterns, receive control signaling indicating a first TCI state pattern of the set of TCI state patterns, receive, via a shared data channel, a TB in each TTI of a set of TTIs in accordance with the first TCI state pattern, and transmit multiple bit feedback indicating at least one TTI of the set of TTIs for which decoding of the TB was successful.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting a TCI pattern list for shared channel transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
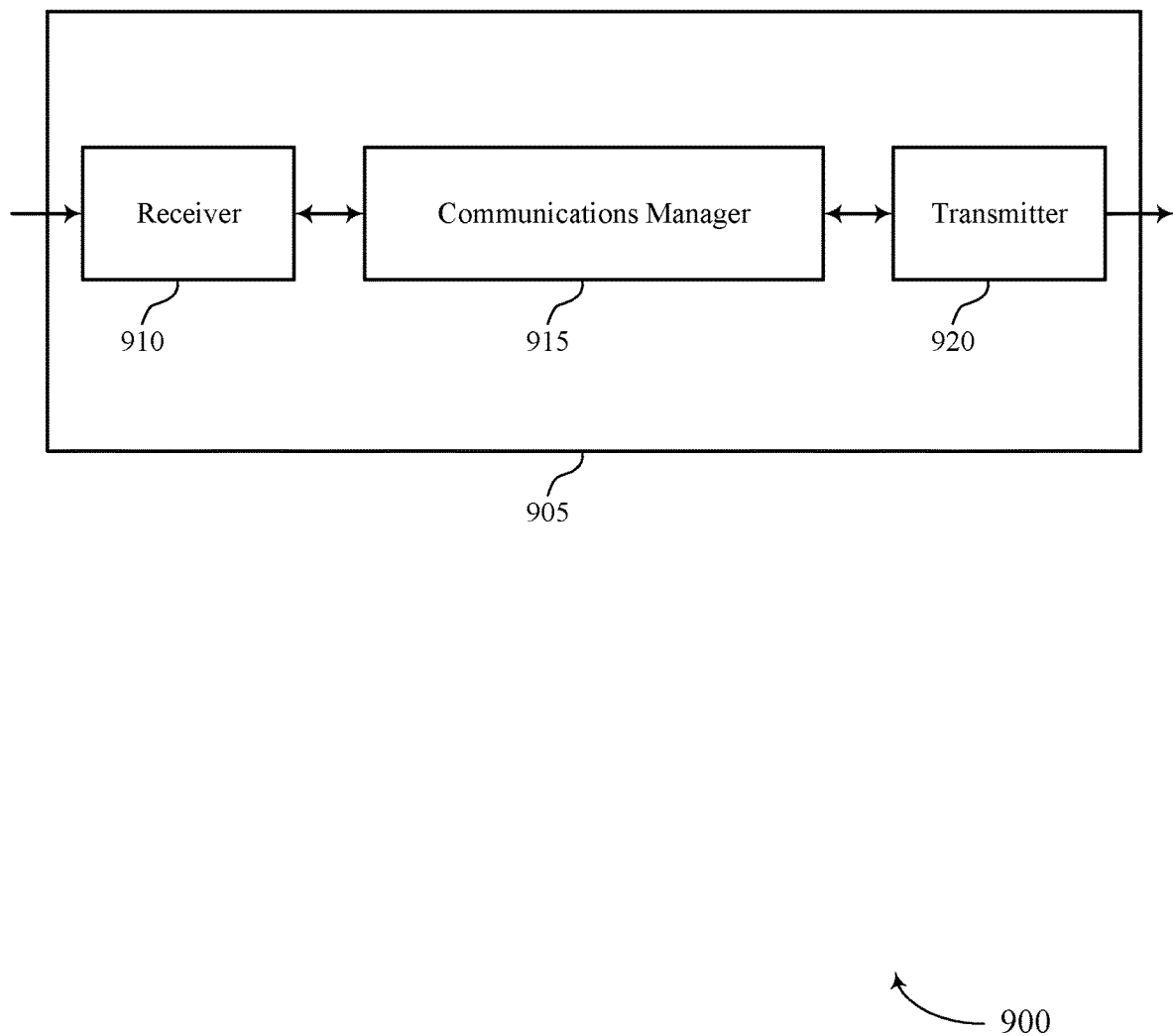
FIGS. 9 and 10 show block diagrams of devices that support TCI pattern lists in accordance with aspects of the present disclosure.

FIG. 9 shows a block diagram 900 of a device 905 that supports TCI pattern lists in accordance with aspects of the present disclosure. For example, a TCI pattern list may be used for shared channel transmission. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to a TCI pattern list for shared channel transmission). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a configuration message indicating a list that includes a set of TCI state patterns, transmit control signaling indicating a first TCI state pattern of the set of TCI state patterns, transmit, via a shared data channel, a TB in each TTI of a set of TTIs in accordance with the first TCI state pattern, and receive multiple bit feedback indicating at least one TTI of the set of TTIs for which decoding of the TB was successful. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
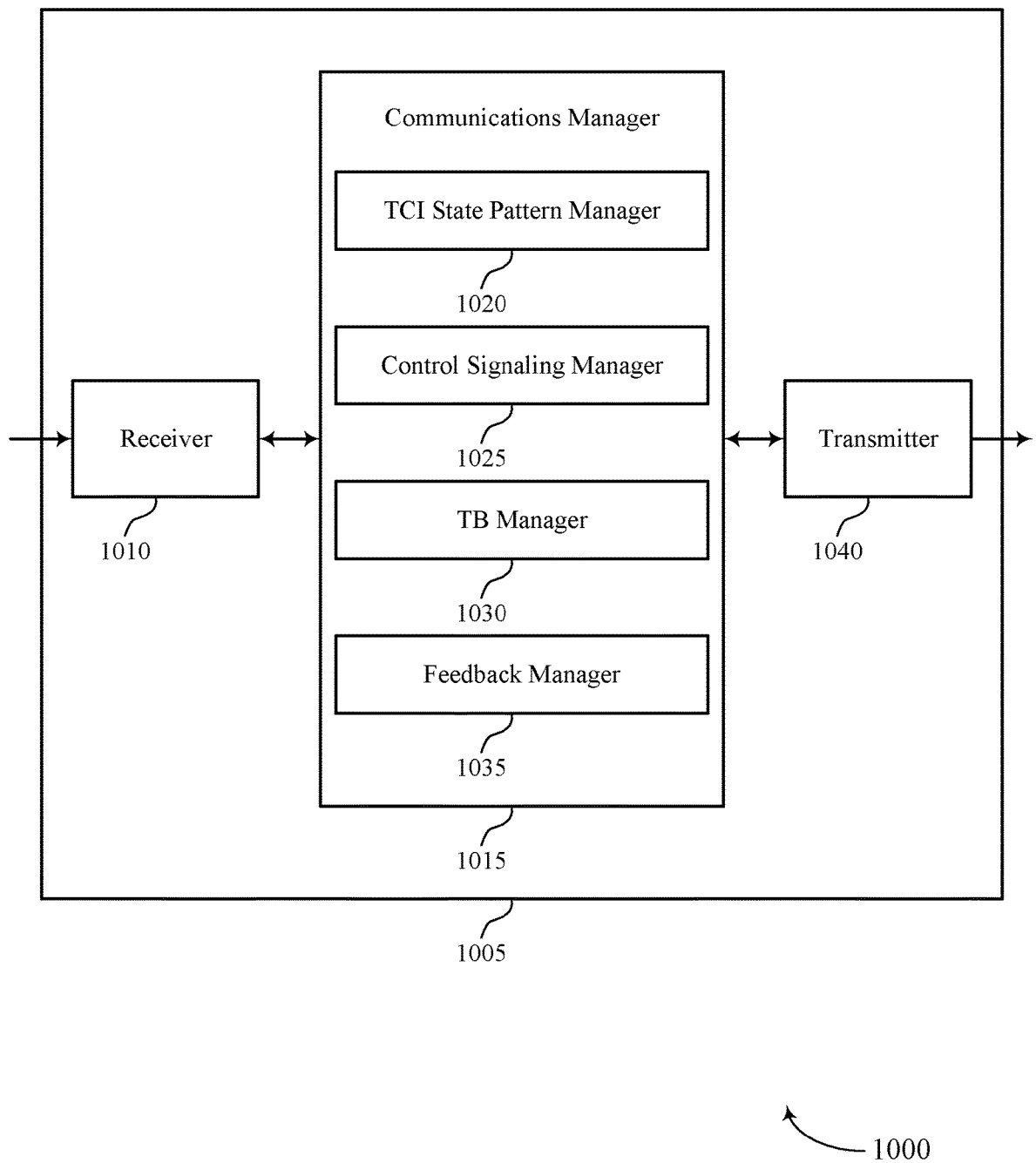

FIG. 10 shows a block diagram 1000 of a device 1005 that supports TCI pattern lists in accordance with aspects of the present disclosure. For example, a TCI pattern list may be used for shared channel transmission. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to a TCI pattern list for shared channel transmission). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a TCI state pattern manager 1020, a control signaling manager 1025, a TB manager 1030, and a feedback manager 1035. The communications manager 1015 may be an example of aspects of the communications manager 1210 described herein.

The TCI state pattern manager 1020 may transmit a configuration message indicating a list that includes a set of TCI state patterns. The control signaling manager 1025 may transmit control signaling indicating a first TCI state pattern of the set of TCI state patterns. The TB manager 1030 may transmit, via a shared data channel, a TB in each TTI of a set of TTIs in accordance with the first TCI state pattern.

The feedback manager 1035 may receive multiple bit feedback indicating at least one TTI of the set of TTIs for which decoding of the TB was successful. In some examples, the multiple bit feedback may indicate an earliest TTI of the set of TTIs in which decoding of the TB was successful. In some examples, the multiple bit feedback may indicate a TTI number of the at least one TTI (e.g., the earliest TTI) in which decoding of the TB was successful. In some examples, the multiple bit feedback may indicate a TTI number of associated with a preferred TTI and/or TCI state (e.g., associated with a transmission having a highest SNR or best signal metric).

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
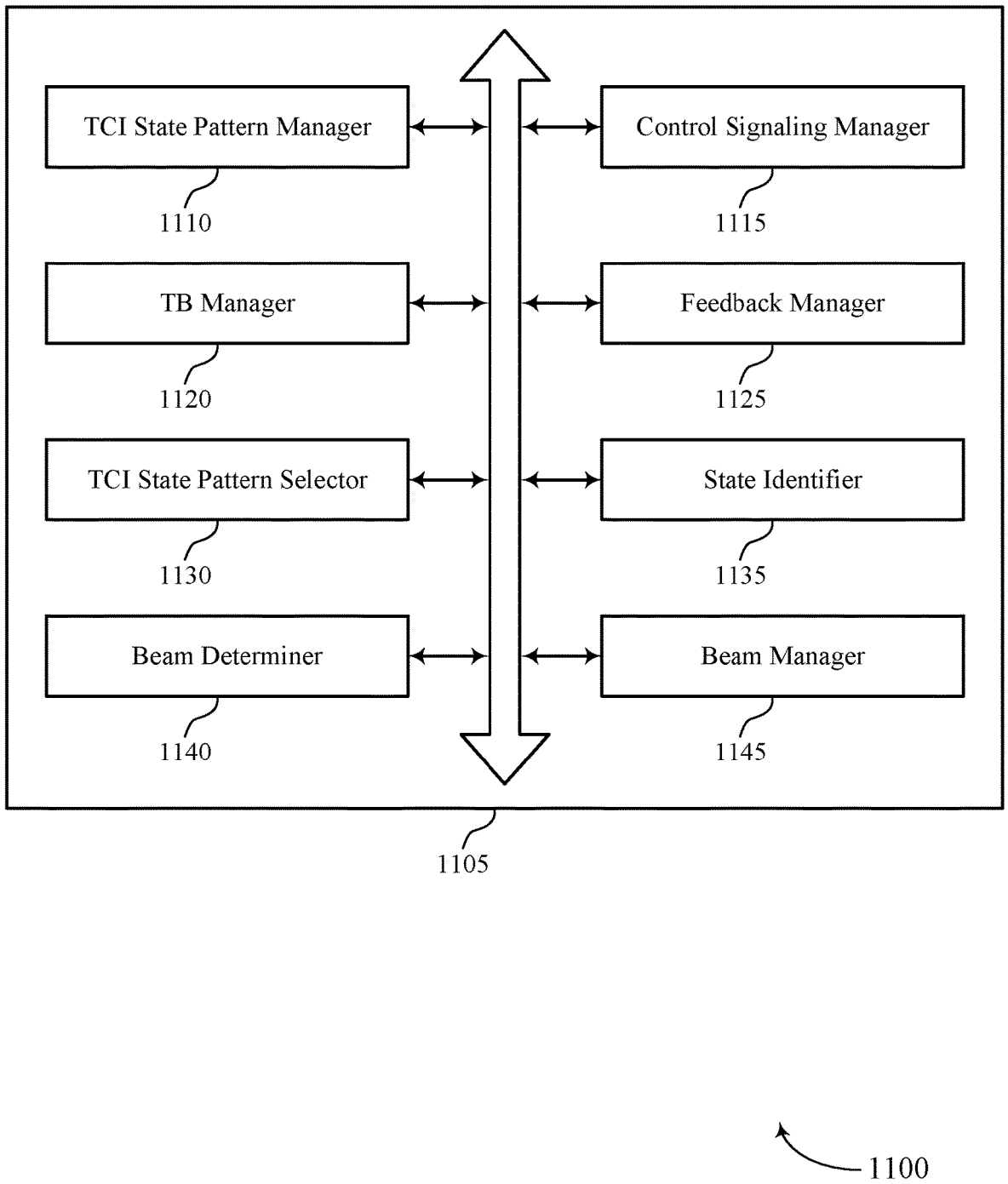
FIG. 11 shows a block diagram of a communications manager that supports TCI pattern lists in accordance with aspects of the present disclosure.

FIG. 11 shows a block diagram 1100 of a communications manager 1105 that supports TCI pattern lists in accordance with aspects of the present disclosure. For example, a TCI pattern list may be used for shared channel transmission. The communications manager 1105 may be an example of aspects of a communications manager 915, a communications manager 1015, or a communications manager 1210 described herein. The communications manager 1105 may include a TCI state pattern manager 1110, a control signaling manager 1115, a TB manager 1120, a feedback manager 1125, a TCI state pattern selector 1130, a state identifier 1135, a beam determiner 1140, and a beam manager 1145. Each of these modules may communicate, directly or indirectly, with one another (e.g., via one or more buses).

The TCI state pattern manager 1110 may transmit a configuration message indicating a list that includes a set of TCI state patterns. In some examples, the TCI state pattern manager 1110 may transmit an RRC message indicating the list. In some cases, each TCI state pattern of the set of TCI state patterns indicates one or more TCI states and a number of TTIs to which each of the one or more TCI states applies. In some instances, the first TCI state pattern indicates a same TCI state for each TTI of the set of TTIs. In some aspects, the first TCI state pattern indicates a first TCI state for a first TTI subset of the set of TTIs and a second TCI state for a second TTI subset of the set of TTIs.

The control signaling manager 1115 may transmit control signaling indicating a first TCI state pattern of the set of TCI state patterns. In some examples, the control signaling manager 1115 may transmit second control signaling indicating the second TCI state pattern. In some cases, the control signaling is DCI or a MAC CE.

The TB manager 1120 may transmit, via a shared data channel, a TB in each TTI of a set of TTIs in accordance with the first TCI state pattern. In some examples, the TB manager 1120 may transmit a retransmission of the TB in each TTI of a second set of TTIs in accordance with the second TCI state pattern. In some cases, the TB manager 1120 may transmit a second TB in each TTI of a second set of TTIs in accordance with the second TCI state pattern. In some instances, the TB manager 1120 may transmit a grant scheduling transmission of the TB during each TTI of the set of TTIs.

The feedback manager 1125 may receive multiple bit feedback indicating at least one TTI of the set of TTIs for which decoding of the TB was successful. In some examples, the feedback manager 1125 may receive second multiple bit feedback indicating whether decoding of the retransmission of the TB was successful for at least one TTI of the second set of TTIs. In some cases, the feedback manager 1125 may receive second multiple bit feedback indicating whether decoding of the second TB was successful for each TTI of the second set of TTIs. In some instances, each bit of the multiple bit feedback corresponds to a respective TTI of the set of TTIs. In some aspects, the multiple bit feedback indicates a particular TCI state of a set of TCI states. In some examples, the multiple bit feedback includes a TTI number of the at least one TTI. In some cases, the multiple bit feedback indicates an earliest TTI of the set of TTIs for which decoding of the TB was successful.

The TCI state pattern selector 1130 may select a second TCI state pattern of the set of TCI state patterns based on the multiple bit feedback, where the second TCI state pattern indicates a TCI state or an order for a set of TCI states that differs from a TCI state or an order for the set of TCI states indicated in the first TCI state pattern.

The state identifier 1135 may identify a first TCI state for a first TTI of the set of TTIs and a second TCI state for a second TTI of the set of TTIs based on the first TCI state pattern. The beam determiner 1140 may identify a first transmit beam based on the first TCI state and a second transmit beam based on the second TCI state. The beam manager 1145 may transmit the TB during the first TTI using the first transmit beam and the TB during the second TTI using the second transmit beam.

Figure 12:
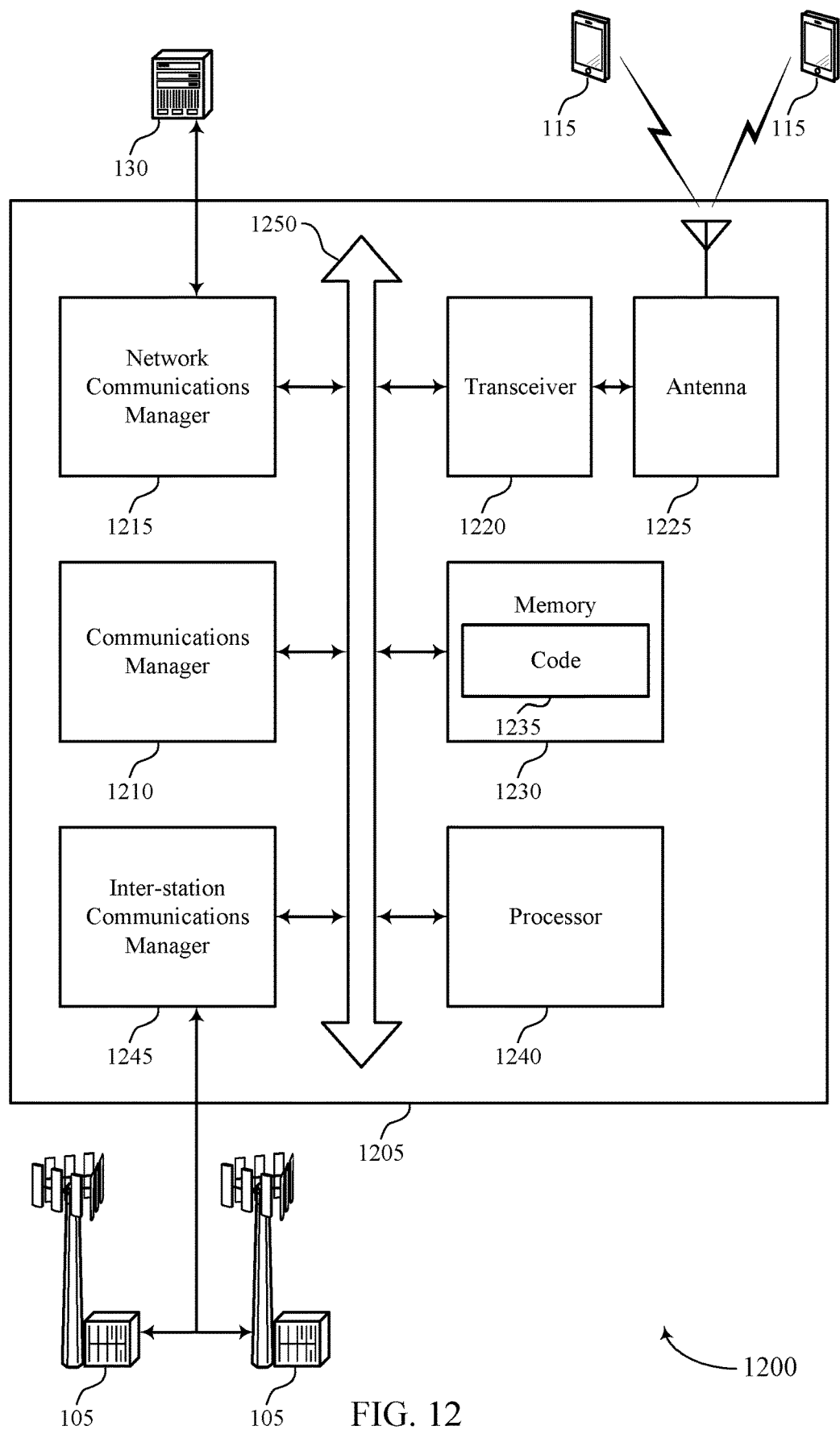
FIG. 12 shows a diagram of a system including a device that supports TCI pattern lists in accordance with aspects of the present disclosure.

FIG. 12 shows a diagram of a system 1200 including a device 1205 that supports TCI pattern lists in accordance with aspects of the present disclosure. For example, a TCI pattern list may be used for shared channel transmission. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a configuration message indicating a list that includes a set of TCI state patterns, transmit control signaling indicating a first TCI state pattern of the set of TCI state patterns, transmit, via a shared data channel, a TB in each TTI of a set of TTIs in accordance with the first TCI state pattern, and receive multiple bit feedback indicating at least one TTI of the set of TTIs for which decoding of the TB was successful.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device to perform various functions (e.g., functions or tasks supporting a TCI pattern list for shared channel transmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
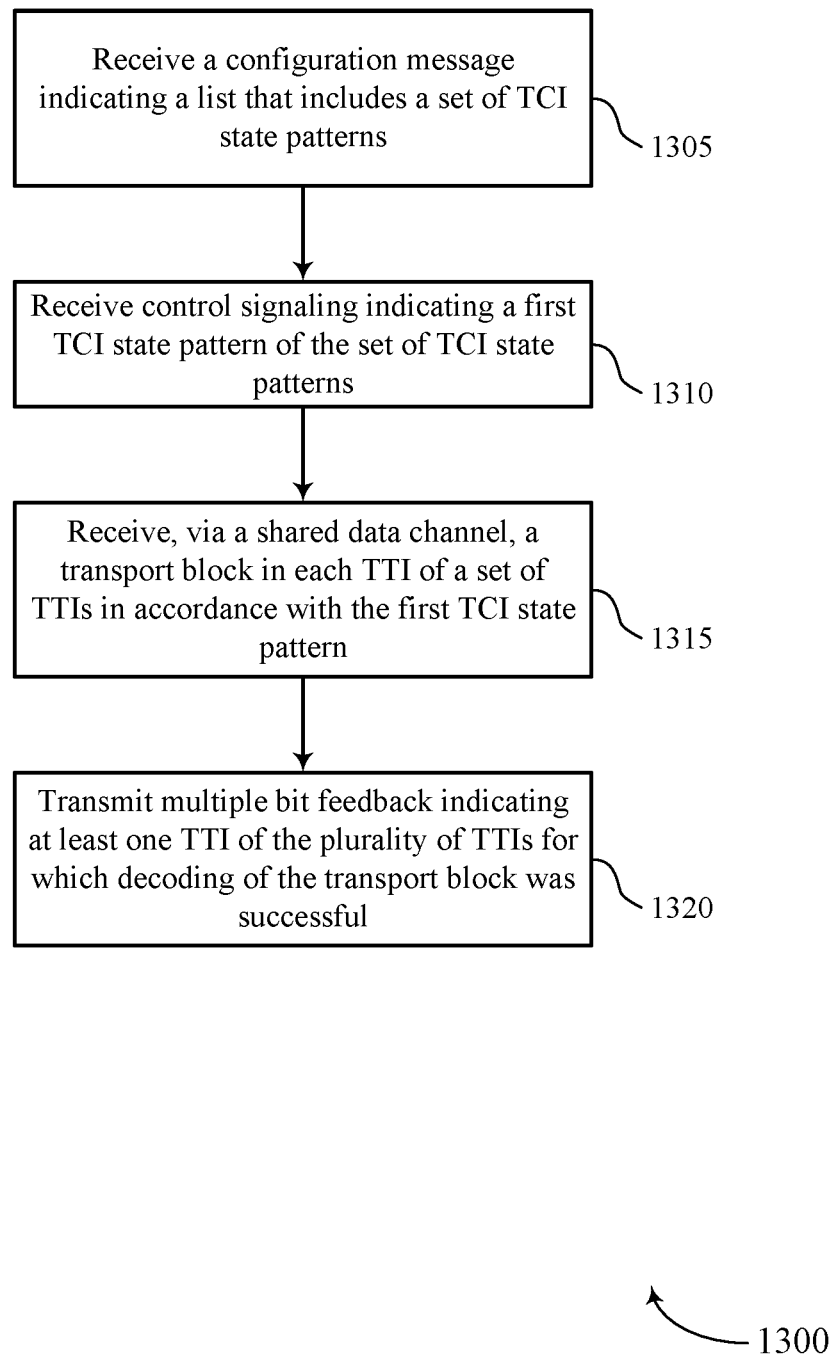
FIGS. 13 through 16 show flowcharts illustrating methods that support TCI pattern lists in accordance with aspects of the present disclosure.

FIG. 13 shows a flowchart illustrating a method 1300 that supports TCI pattern lists in accordance with aspects of the present disclosure. For example, a TCI pattern list may be used for shared channel transmission. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration message indicating a list that includes a set of TCI state patterns. The operations of 1305 may be performed according to the methods described herein. In some examples, aspects of the operations of 1305 may be performed by a TCI state pattern manager as described with reference to FIGS. 5 through 8.

At 1310, the UE may receive control signaling indicating a first TCI state pattern of the set of TCI state patterns. The operations of 1310 may be performed according to the methods described herein. In some examples, aspects of the operations of 1310 may be performed by a control signaling manager as described with reference to FIGS. 5 through 8.

At 1315, the UE may receive, via a shared data channel, a TB in each TTI of a set of TTIs in accordance with the first TCI state pattern. The operations of 1315 may be performed according to the methods described herein. In some examples, aspects of the operations of 1315 may be performed by a TB processor as described with reference to FIGS. 5 through 8.

At 1320, the UE may transmit multiple bit feedback indicating at least one TTI of the set of TTIs for which decoding of the TB was successful. The operations of 1320 may be performed according to the methods described herein. In some examples, aspects of the operations of 1320 may be performed by a feedback generator as described with reference to FIGS. 5 through 8.

Figure 14:
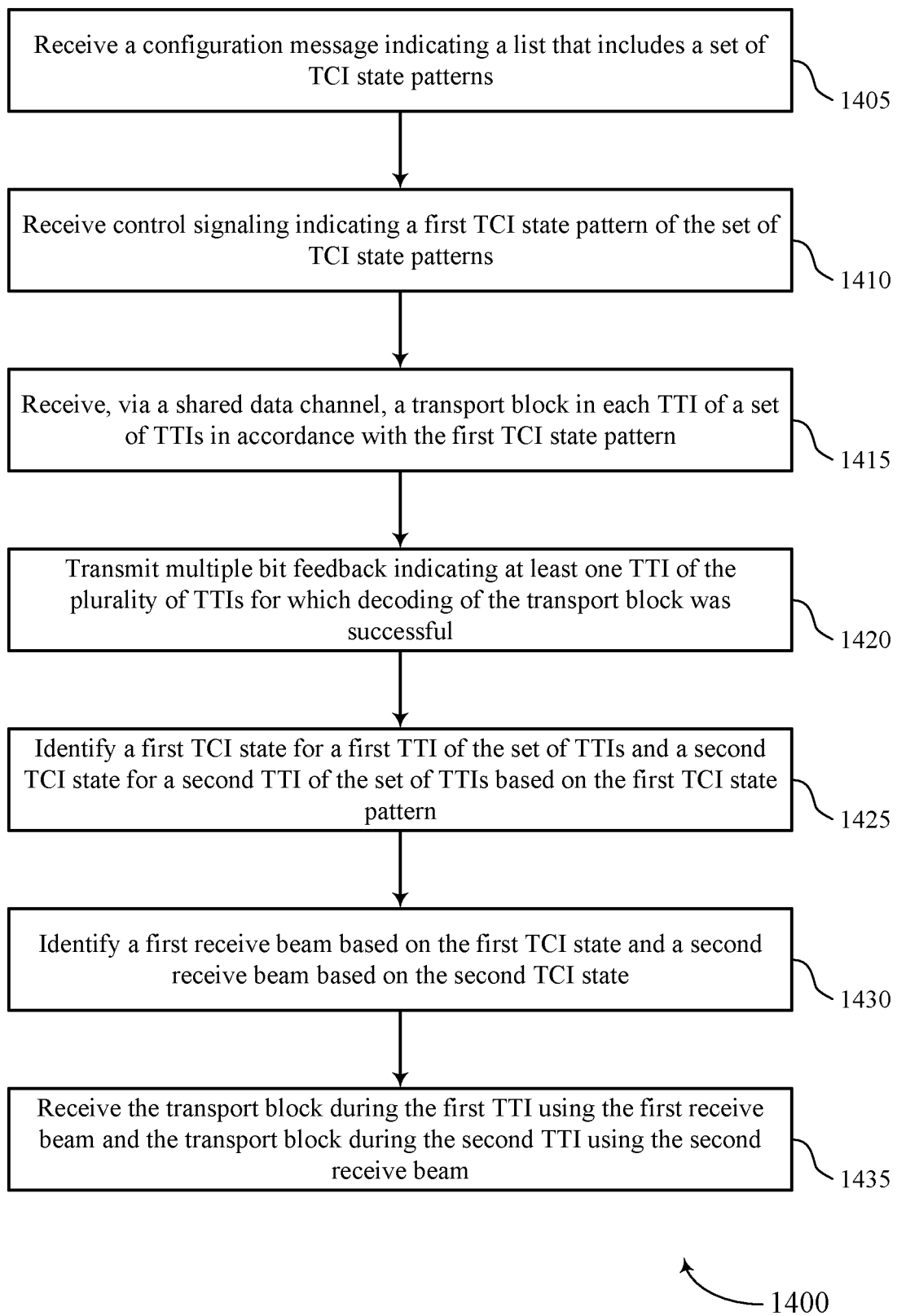

FIG. 14 shows a flowchart illustrating a method 1400 that supports TCI pattern lists in accordance with aspects of the present disclosure. For example, a TCI pattern list may be used for shared channel transmission. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration message indicating a list that includes a set of TCI state patterns. The operations of 1405 may be performed according to the methods described herein. In some examples, aspects of the operations of 1405 may be performed by a TCI state pattern manager as described with reference to FIGS. 5 through 8.

At 1410, the UE may receive control signaling indicating a first TCI state pattern of the set of TCI state patterns. The operations of 1410 may be performed according to the methods described herein. In some examples, aspects of the operations of 1410 may be performed by a control signaling manager as described with reference to FIGS. 5 through 8.

At 1415, the UE may receive, via a shared data channel, a TB in each TTI of a set of TTIs in accordance with the first TCI state pattern. The operations of 1415 may be performed according to the methods described herein. In some examples, aspects of the operations of 1415 may be performed by a TB processor as described with reference to FIGS. 5 through 8.

At 1420, the UE may transmit multiple bit feedback indicating at least one TTI of the set of TTIs for which decoding of the TB was successful. The operations of 1420 may be performed according to the methods described herein. In some examples, aspects of the operations of 1420 may be performed by a feedback generator as described with reference to FIGS. 5 through 8.

At 1425, the UE may identify a first TCI state for a first TTI of the set of TTIs and a second TCI state for a second TTI of the set of TTIs based on the first TCI state pattern. The operations of 1425 may be performed according to the methods described herein. In some examples, aspects of the operations of 1425 may be performed by a state identifier as described with reference to FIGS. 5 through 8.

At 1430, the UE may identify a first receive beam based on the first TCI state and a second receive beam based on the second TCI state. The operations of 1430 may be performed according to the methods described herein. In some examples, aspects of the operations of 1430 may be performed by a state identifier as described with reference to FIGS. 5 through 8.

At 1435, the UE may receive the TB during the first TTI using the first receive beam and the TB during the second TTI using the second receive beam. The operations of 1435 may be performed according to the methods described herein. In some examples, aspects of the operations of 1435 may be performed by a beam determiner as described with reference to FIGS. 5 through 8.

Figure 15:
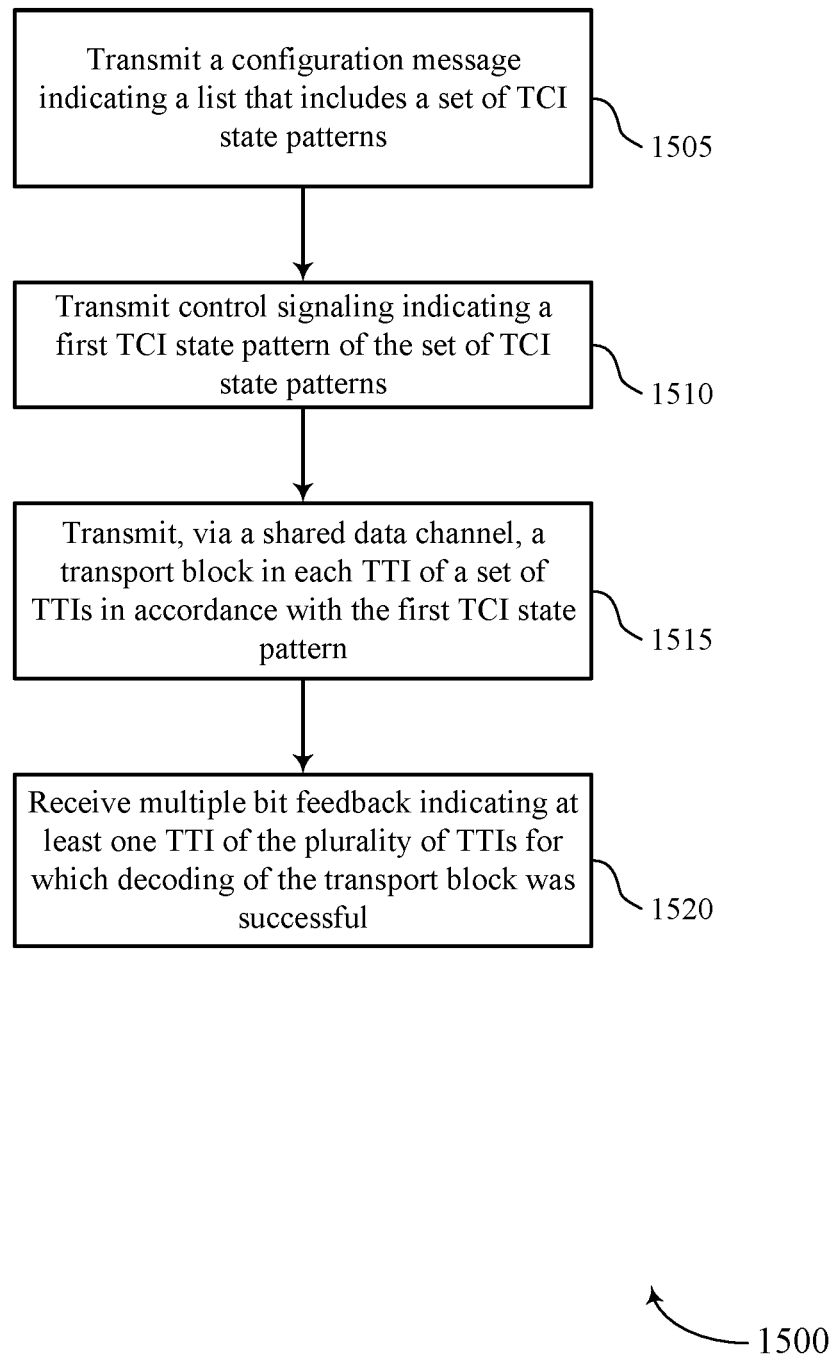

FIG. 15 shows a flowchart illustrating a method 1500 that supports TCI pattern lists in accordance with aspects of the present disclosure. For example, a TCI pattern list may be used for shared channel transmission. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit a configuration message indicating a list that includes a set of TCI state patterns. The operations of 1505 may be performed according to the methods described herein. In some examples, aspects of the operations of 1505 may be performed by a TCI state pattern manager as described with reference to FIGS. 9 through 12.

At 1510, the base station may transmit control signaling indicating a first TCI state pattern of the set of TCI state patterns. The operations of 1510 may be performed according to the methods described herein. In some examples, aspects of the operations of 1510 may be performed by a control signaling manager as described with reference to FIGS. 9 through 12.

At 1515, the base station may transmit, via a shared data channel, a TB in each TTI of a set of TTIs in accordance with the first TCI state pattern. The operations of 1515 may be performed according to the methods described herein. In some examples, aspects of the operations of 1515 may be performed by a TB manager as described with reference to FIGS. 9 through 12.

At 1520, the base station may receive multiple bit feedback indicating at least one TTI of the set of TTIs for which decoding of the TB was successful. The operations of 1520 may be performed according to the methods described herein. In some examples, aspects of the operations of 1520 may be performed by a feedback manager as described with reference to FIGS. 9 through 12.

Figure 16:
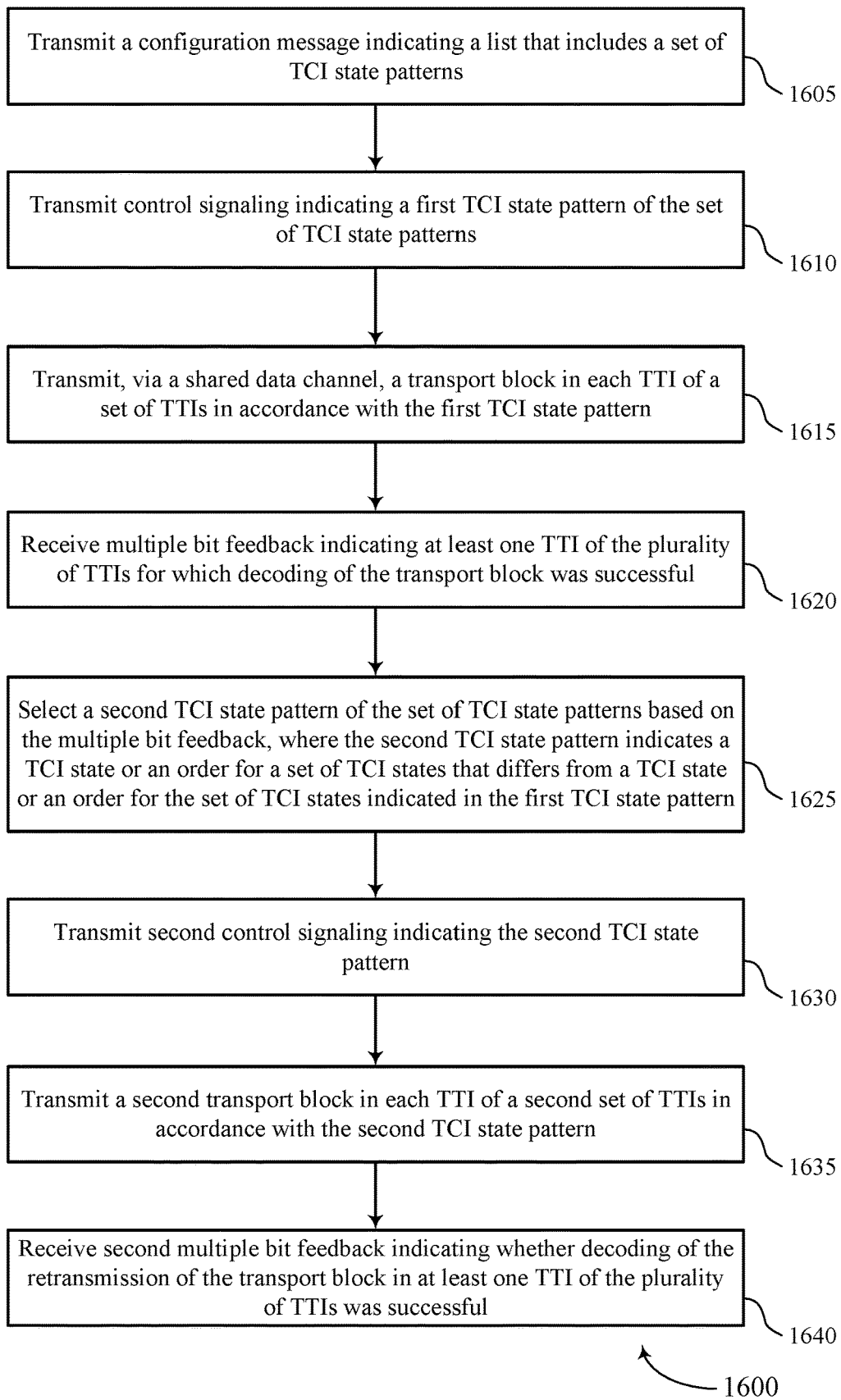

FIG. 16 shows a flowchart illustrating a method 1600 that supports TCI pattern lists in accordance with aspects of the present disclosure. For example, a TCI pattern list may be used for shared channel transmission. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit a configuration message indicating a list that includes a set of TCI state patterns. The operations of 1605 may be performed according to the methods described herein. In some examples, aspects of the operations of 1605 may be performed by a TCI state pattern manager as described with reference to FIGS. 9 through 12.

At 1610, the base station may transmit control signaling indicating a first TCI state pattern of the set of TCI state patterns. The operations of 1610 may be performed according to the methods described herein. In some examples, aspects of the operations of 1610 may be performed by a control signaling manager as described with reference to FIGS. 9 through 12.

At 1615, the base station may transmit, via a shared data channel, a TB in each TTI of a set of TTIs in accordance with the first TCI state pattern. The operations of 1615 may be performed according to the methods described herein. In some examples, aspects of the operations of 1615 may be performed by a TB manager as described with reference to FIGS. 9 through 12.

At 1620, the base station may receive multiple bit feedback indicating at least one TTI of the set of TTIs for which decoding of the TB was successful. The operations of 1620 may be performed according to the methods described herein. In some examples, aspects of the operations of 1620 may be performed by a feedback manager as described with reference to FIGS. 9 through 12.

At 1625, the base station may select a second TCI state pattern of the set of TCI state patterns based on the multiple bit feedback, where the second TCI state pattern indicates a TCI state or an order for a set of TCI states that differs from a TCI state or an order for the set of TCI states indicated in the first TCI state pattern. The operations of 1625 may be performed according to the methods described herein. In some examples, aspects of the operations of 1625 may be performed by a TCI state pattern selector as described with reference to FIGS. 9 through 12.

At 1630, the base station may transmit second control signaling indicating the second TCI state pattern. The operations of 1630 may be performed according to the methods described herein. In some examples, aspects of the operations of 1630 may be performed by a control signaling manager as described with reference to FIGS. 9 through 12.

At 1635, the base station may transmit a second TB in each TTI of a second set of TTIs in accordance with the second TCI state pattern. The operations of 1635 may be performed according to the methods described herein. In some examples, aspects of the operations of 1635 may be performed by a TB manager as described with reference to FIGS. 9 through 12.

At 1640, the base station may receive second multiple bit feedback indicating whether decoding of the second TB was successful for at least one TTI of the second set of TTIs. The operations of 1640 may be performed according to the methods described herein. In some examples, aspects of the operations of 1640 may be performed by a feedback manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a configuration message indicating a list that comprises a plurality of transmission configuration indicator (TCI) state patterns, each entry in the list corresponding to a different TCI state pattern of the plurality of TCI state patterns, and at least one pattern of the plurality of TCI state patterns comprising two or more different TCI states;
    receiving control signaling indicating a first entry in the list corresponding to a first TCI state pattern of the plurality of TCI state patterns, the first TCI state pattern indicating a set of one or more TCI states, each TCI state in the set corresponding to a respective communication beam applied during a respective transmission time interval (TTI) of a plurality of TTIs;
    receiving, via a shared data channel, a transport block in each TTI of the plurality of TTIs in accordance with the first TCI state pattern; and
    transmitting multiple bit feedback indicating at least one TTI of the plurality of TTIs for which decoding by the UE of the received transport block was successful.

2. The method of claim 1, wherein each TCI state pattern of the plurality of TCI state patterns indicates one or more TCI states and a number of TTIs to which each of the one or more TCI states applies.

3. The method of claim 1, wherein receiving the transport block further comprises:

identifying a first TCI state for a first TTI of the plurality of TTIs and a second TCI state for a second TTI of the plurality of TTIs based at least in part on the first TCI state pattern;

identifying a first receive beam based at least in part on the first TCI state and a second receive beam based at least in part on the second TCI state; and receiving the transport block during the first TTI using the first receive beam and the transport block during the second TTI using the second receive beam.

4. The method of claim 1, further comprising:
receiving second control signaling indicating a second TCI state pattern of the plurality of TCI state patterns, wherein the second TCI state pattern indicates a first TCI state or a first order for a plurality of TCI states that differs from a second TCI state or a second order for the plurality of TCI states indicated in the first TCI state pattern;

receiving a retransmission of the transport block in each TTI of a second plurality of TTIs in accordance with the second TCI state pattern; and transmitting second multiple bit feedback indicating whether decoding of the retransmission of the transport block in at least one TTI of the second plurality of TTIs was successful.

5. The method of claim 4, wherein the second control signaling is received in response to the multiple bit feedback.

6. The method of claim 1, further comprising:
receiving second control signaling indicating a second TCI state pattern of the plurality of TCI state patterns, wherein the second TCI state pattern indicates a first TCI state or a first order for a plurality of TCI states that differs from a second TCI state or a second order for the plurality of TCI states indicated in the first TCI state pattern;

receiving a second transport block in each TTI of a second plurality of TTIs in accordance with the second TCI state pattern; and transmitting second multiple bit feedback indicating whether decoding of the second transport block in at least one TTI of the second plurality of TTIs was successful.

7. The method of claim 6, wherein the second control signaling is received in response to the multiple bit feedback.

8. The method of claim 1, wherein receiving the configuration message indicating the list further comprises:
receiving a radio resource control (RRC) message indicating the list.

9. The method of claim 1, wherein the control signaling is downlink control information (DCI) or a medium access control (MAC) control element (CE).

10. The method of claim 1, further comprising:
receiving a grant scheduling transmission of the transport block during each TTI of the plurality of TTIs.

11. The method of claim 1, wherein the first TCI state pattern indicates a same TCI state for each TTI of the plurality of TTIs.

12. The method of claim 1, wherein the first TCI state pattern indicates a first TCI state for a first TTI subset of the plurality of TTIs and a second TCI state for a second TTI subset of the plurality of TTIs.

13. The method of claim 1, wherein each bit of the multiple bit feedback corresponds to a respective TTI of the plurality of TTIs.

14. The method of claim 1, wherein the multiple bit feedback indicates a particular TCI state of a plurality of TCI states.

15. The method of claim 1, wherein the multiple bit feedback comprises a TTI number of the at least one TTI of the plurality of TTIs.

16. The method of claim 1, wherein the multiple bit feedback indicates an earliest TTI of the plurality of TTIs for which decoding of the transport block was successful.

17. A method for wireless communication at a base station, comprising:
transmitting a configuration message indicating a list that comprises a plurality of transmission configuration indicator (TCI) state patterns, each entry in the list corresponding to a different TCI state pattern of the plurality of TCI state patterns, and at least one pattern of the plurality of TCI state patterns comprising two or more different TCI states;

transmitting control signaling indicating a first entry in the list corresponding to a first TCI state pattern of the plurality of TCI state patterns, the first TCI state pattern indicating a set of one or more TCI states, each TCI state in the set corresponding to a respective communication beam applied during a respective transmission time interval (TTI) of a plurality of TTIs;

transmitting, via a shared data channel, a transport block in each TTI of the plurality of TTIs in accordance with the first TCI state pattern; and receiving multiple bit feedback indicating at least one TTI of the plurality of TTIs for which decoding by a user equipment (UE) of the transmitted transport block was successful.

18. The method of claim 17, wherein each TCI state pattern of the plurality of TCI state patterns indicates one or more TCI states and a number of TTIs to which each of the one or more TCI states applies.

19. The method of claim 17, further comprising:
selecting a second TCI state pattern of the plurality of TCI state patterns based at least in part on the multiple bit feedback, wherein the second TCI state pattern indicates a first TCI state or a first order for a plurality of TCI states that differs from a second TCI state or a second order for the plurality of TCI states indicated in the first TCI state pattern;

transmitting second control signaling indicating the second TCI state pattern;

transmitting a retransmission of the transport block in each TTI of a second plurality of TTIs in accordance with the second TCI state pattern; and receiving second multiple bit feedback indicating whether decoding of the retransmission of the transport block in at least one TTI of the second plurality of TTIs was successful.

20. The method of claim 17, further comprising:
selecting a second TCI state pattern of the plurality of TCI state patterns based at least in part on the multiple bit feedback, wherein the second TCI state pattern indicates a first TCI state or a first order for a plurality of TCI states that differs from a second TCI state or a second order for the plurality of TCI states indicated in the first TCI state pattern;

transmitting second control signaling indicating the second TCI state pattern;

transmitting a second transport block in each TTI of a second plurality of TTIs in accordance with the second TCI state pattern; and receiving second multiple bit feedback whether decoding of the second transport block in at least one TTI of the second plurality of TTIs was successful.

21. The method of claim 17, wherein receiving the transport block further comprises:
identifying a first TCI state for a first TTI of the plurality of TTIs and a second TCI state for a second TTI of the plurality of TTIs based at least in part on the first TCI state pattern;
identifying a first transmit beam based at least in part on the first TCI state and a second transmit beam based at least in part on the second TCI state; and
transmitting the transport block during the first TTI using the first transmit beam and the transport block during the second TTI using the second transmit beam.

22. The method of claim 17, wherein transmitting the configuration message indicating the list further comprises:
transmitting a radio resource control (RRC) message indicating the list.

23. The method of claim 17, wherein the control signaling is downlink control information (DCI) or a medium access control (MAC) control element (CE).

24. The method of claim 17, further comprising:
transmitting a grant scheduling transmission of the transport block during each TTI of the plurality of TTIs.

25. The method of claim 17, wherein the first TCI state pattern indicates a same TCI state for each TTI of the plurality of TTIs.

26. The method of claim 17, wherein the first TCI state pattern indicates a first TCI state for a first TTI subset of the plurality of TTIs and a second TCI state for a second TTI subset of the plurality of TTIs.

27. The method of claim 17, wherein each bit of the multiple bit feedback corresponds to a respective TTI of the plurality of TTIs.

28. The method of claim 17, wherein the multiple bit feedback indicates a particular TCI state of a plurality of TCI states.

29. An apparatus for wireless communication at a user equipment (UE), comprising: a receiver; a processor, memory in electronic communication with the processor; and
instructions stored in the memory and executable by the processor to cause the apparatus to:
receive, via the receiver, a configuration message indicating a list that comprises a plurality of transmission configuration indicator (TCI) state patterns, each entry in the list corresponding to a different TCI state pattern of the plurality of TCI state patterns, and at least one pattern of the plurality of TCI state patterns comprising two or more different TCI states;
receive, via the receiver, control signaling indicating a first entry in the list corresponding to a first TCI state pattern of the plurality of TCI state patterns, the first TCI state pattern indicating a set of one or more TCI states, each TCI state in the set corresponding to a respective communication beam applied during a respective transmission time interval (TTI) of a plurality of TTIs;
receive, via a shared data channel, a transport block in each TTI of the plurality of TTIs in accordance with the first TCI state pattern; and
transmit multiple bit feedback indicating at least one TTI of the plurality of TTIs for which decoding by the UE of the received transport block was successful.

30. An apparatus for wireless communication at a base station, comprising: a transmitter; a processor, memory in electronic communication with the processor; and instructions stored in the memory and executable by the processor to cause the apparatus to:
transmit, via the transmitter, a configuration message indicating a list that comprises a plurality of transmission configuration indicator (TCI) state patterns, each entry in the list corresponding to a different TCI state pattern of the plurality of TCI state patterns, and at least one pattern of the plurality of TCI state patterns comprising two or more different TCI states;
transmit, via the transmitter, control signaling indicating a first entry in the list corresponding to a first TCI state pattern of the plurality of TCI state patterns, the first TCI state pattern indicating a set of one or more TCI states, each TCI state in the set corresponding to a respective communication beam applied during a respective transmission time interval (TTI) of a plurality of TTIs;
transmit, via a shared data channel, a transport block in each TTI of the plurality of TTIs in accordance with the first TCI state pattern; and
receive multiple bit feedback indicating at least one TTI of the plurality of TTIs for which decoding by a user equipment (UE) of the transmitted transport block was successful.

* * * * *